United States Patent
Thomas et al.

(10) Patent No.: US 10,217,314 B2
(45) Date of Patent: Feb. 26, 2019

(54) POSITION-CHANGING ELEMENTS ON A VIDEO SCREEN IN A WAGERING GAME EVENT

(71) Applicants: Evan Thomas, Las Vegas, NV (US); Troy Pettie, Las Vegas, NV (US)

(72) Inventors: Evan Thomas, Las Vegas, NV (US); Troy Pettie, Las Vegas, NV (US)

( * ) Notice: Subject to any disclaimer, the term of this patent is extended or adjusted under 35 U.S.C. 154(b) by 58 days.

(21) Appl. No.: 15/434,054

(22) Filed: Feb. 16, 2017

(65) Prior Publication Data

US 2017/0301178 A1    Oct. 19, 2017

Related U.S. Application Data

(60) Provisional application No. 62/310,982, filed on Mar. 21, 2016.

(51) Int. Cl.
  *G07F 17/32*  (2006.01)
  *G07F 17/34*  (2006.01)
  *A63F 13/55*  (2014.01)

(52) U.S. Cl.
  CPC .......... *G07F 17/3213* (2013.01); *A63F 13/55* (2014.09); *G07F 17/32* (2013.01); *G07F 17/3251* (2013.01); *G07F 17/3267* (2013.01); *G07F 17/3288* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 9,011,236 B2* | 4/2015 | Nelson | G07F 17/3225 463/25 |
| 9,824,536 B2* | 11/2017 | Shorrock | G07F 17/3244 |
| 2008/0009344 A1* | 1/2008 | Graham | G07F 17/32 463/25 |
| 2014/0045586 A1* | 2/2014 | Allen | G07F 17/3288 463/25 |
| 2014/0235338 A1 | 8/2014 | Hansson | |

OTHER PUBLICATIONS

Written Opinion of the International Search Authority for PCT/US2017/019791.

* cited by examiner

*Primary Examiner* — Ronald Laneau
(74) *Attorney, Agent, or Firm* — Mark A. Litman & Assoc. P.A.

(57) ABSTRACT

A gaming event is executed on electronic gaming media. A wager is accepted by a processor and a random selection of both virtual symbols and moves is provided to a player by a display screen on a wagering device. The virtual symbols are randomly arranged on a grid having columns and rows. The player inputs commands to the processor to switch individual pairs of virtual symbols, one pair switched in each available move, until moves are exhausted. A final arrangement of virtual symbols on the grid is evaluated according to paylines and paytables to resolve the wager.

20 Claims, 10 Drawing Sheets

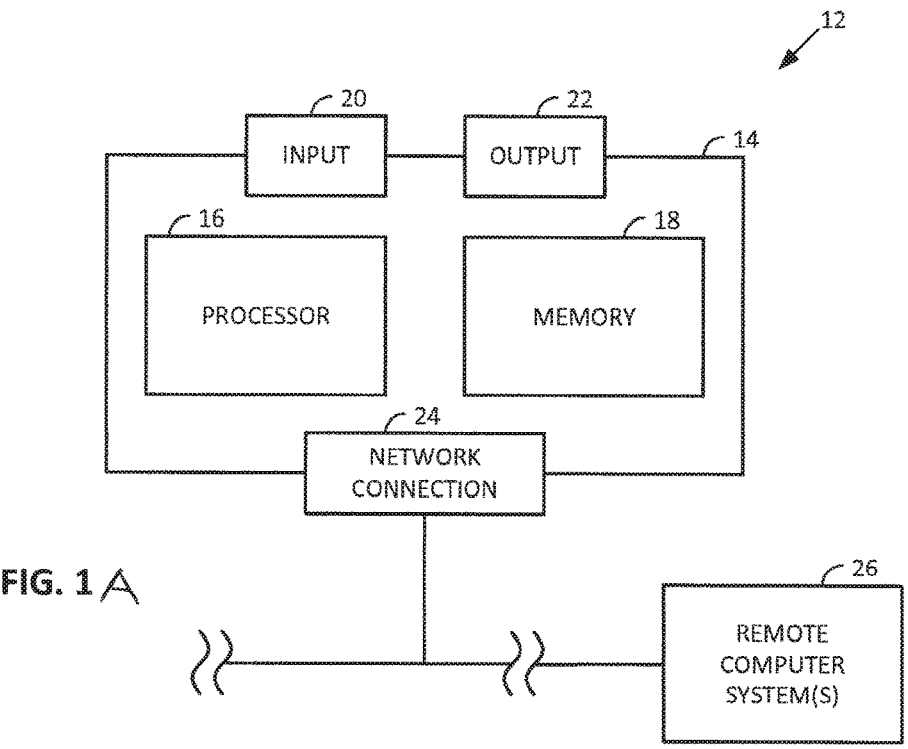

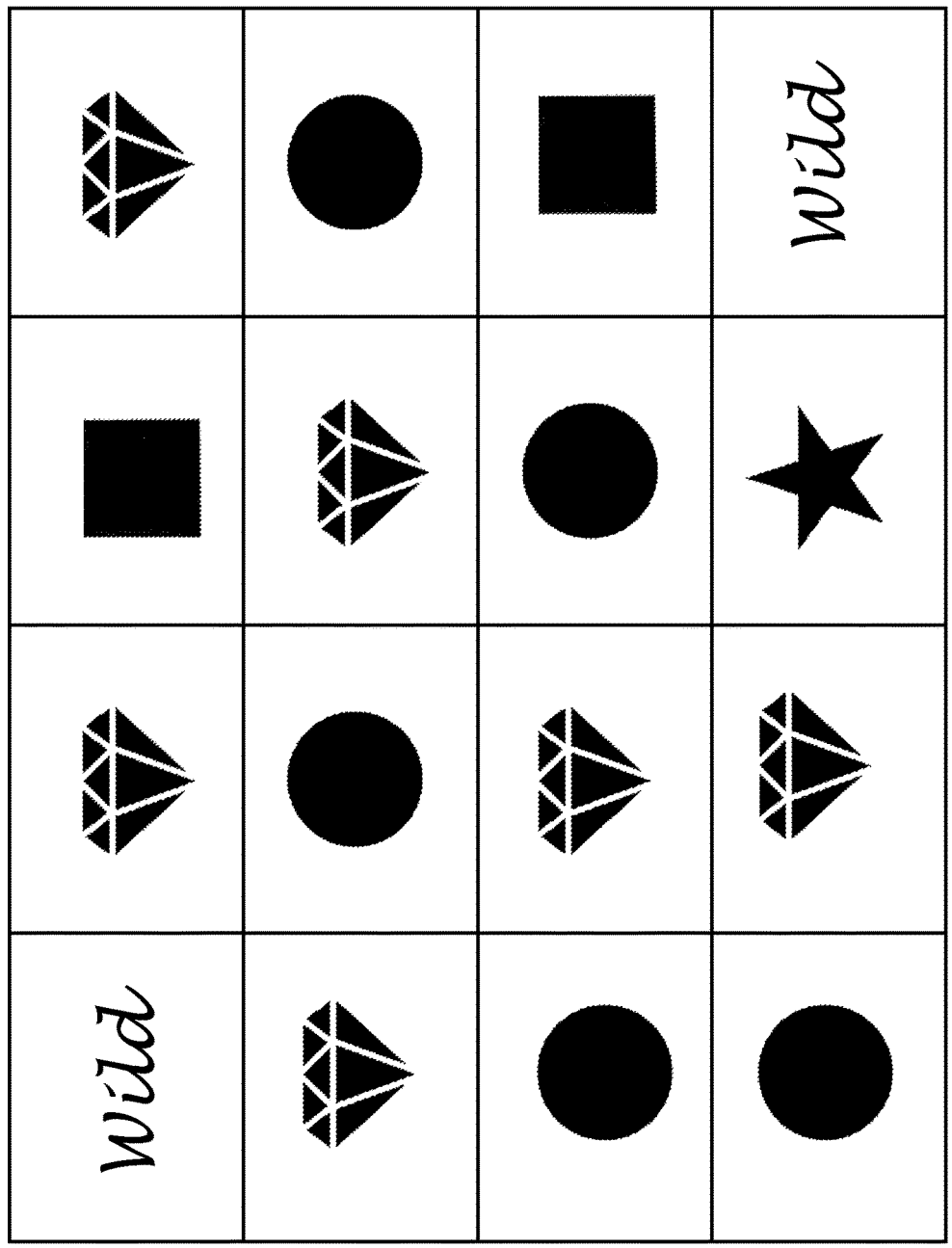
FIG. 6    2 moves

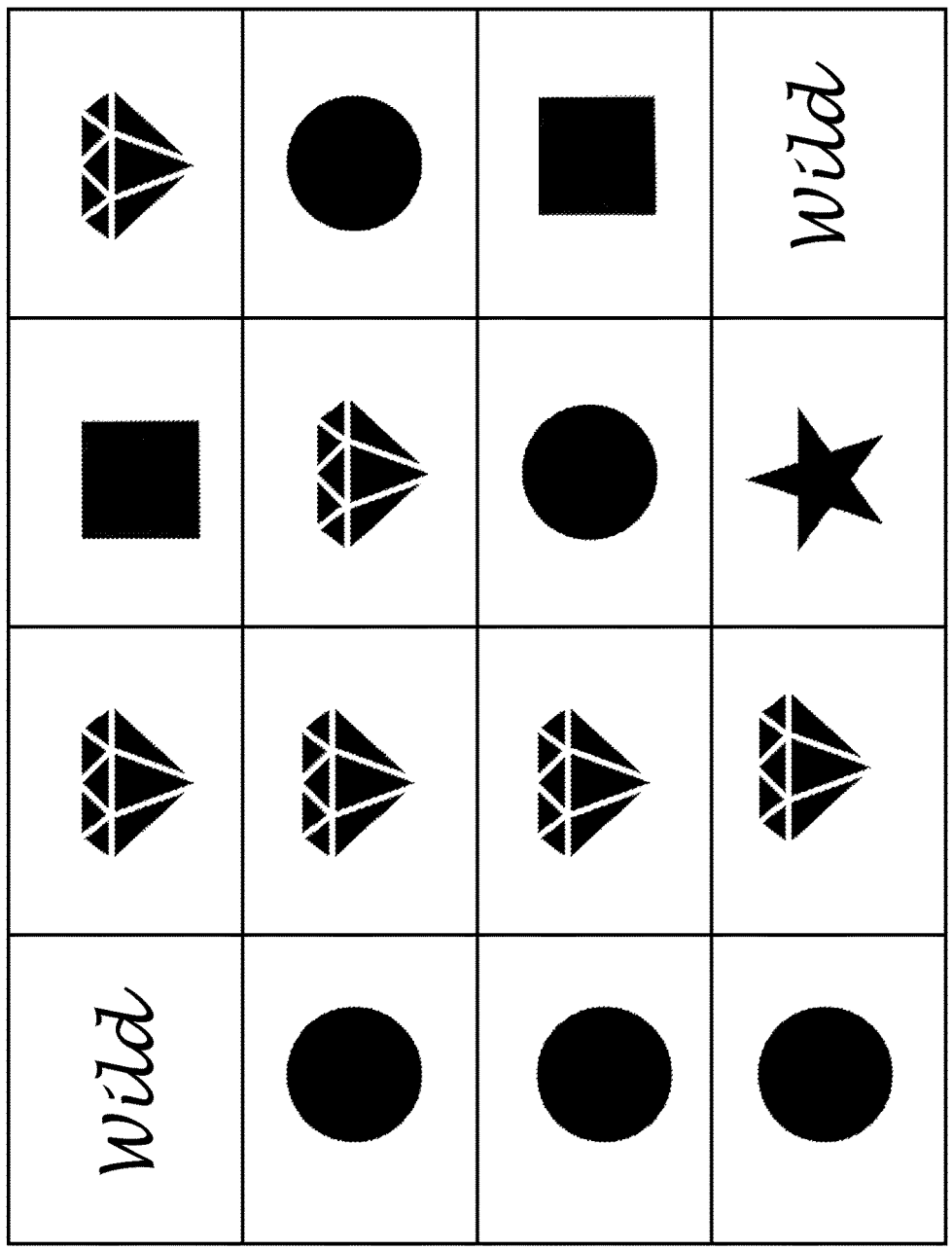
FIG. 7    1 move left

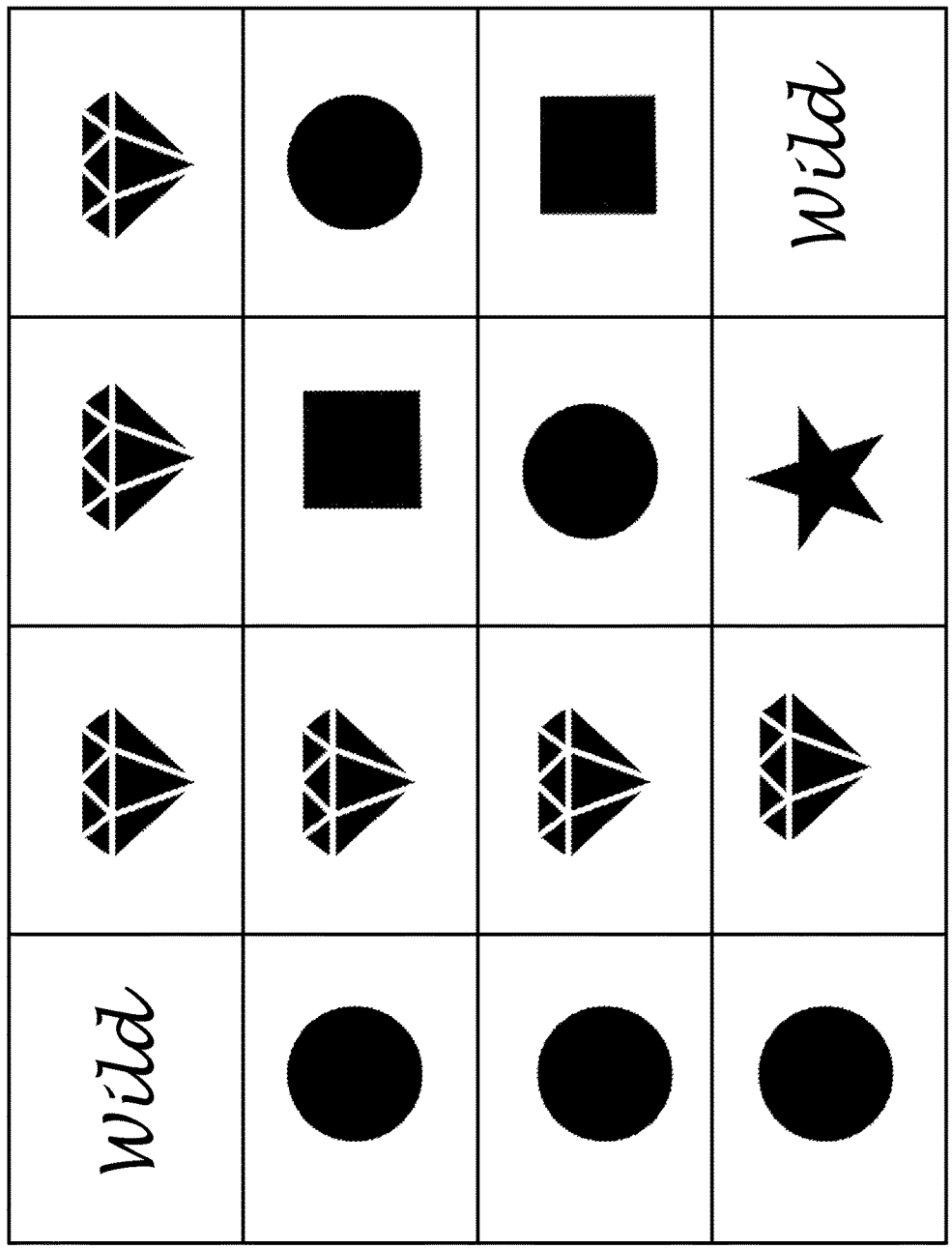
FIG. 8  0 moves left

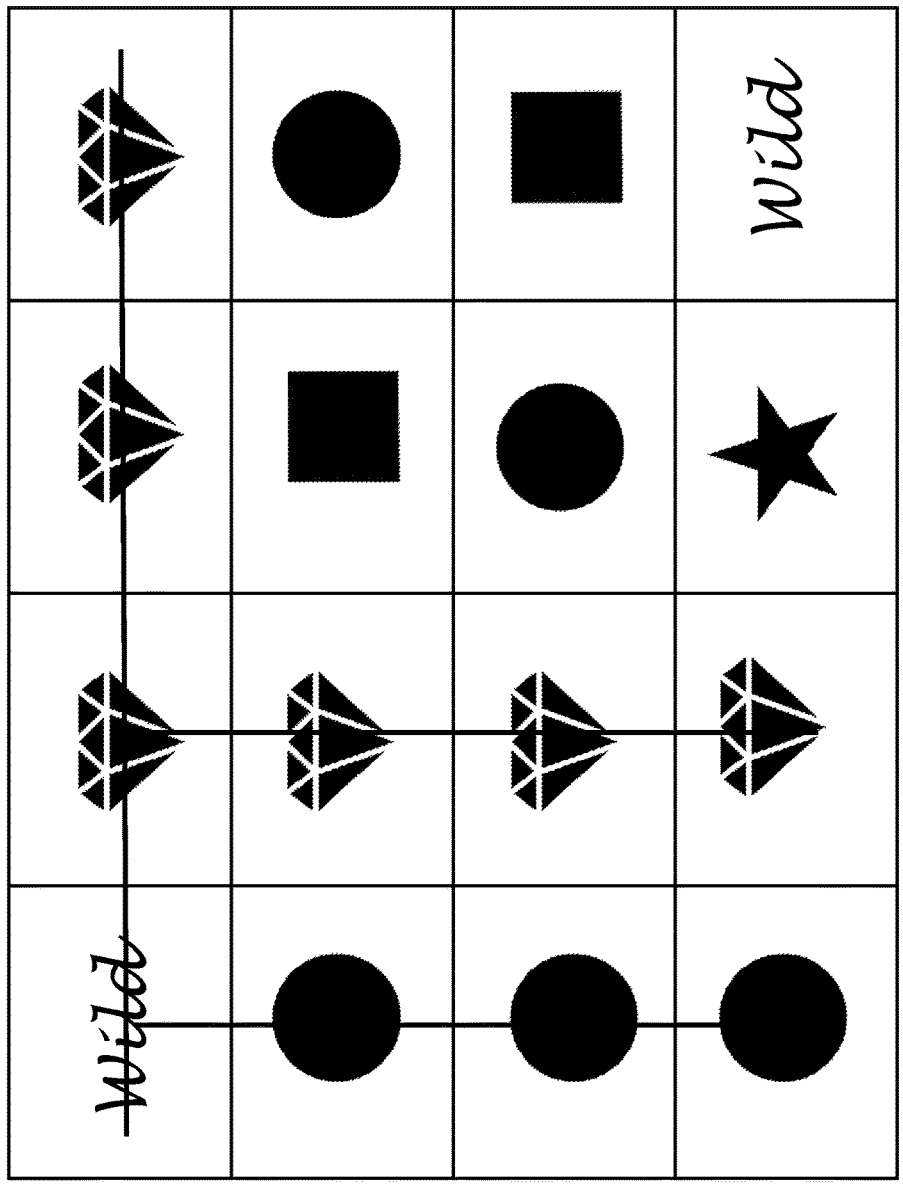
FIG. 9   0 moves

POSITION-CHANGING ELEMENTS ON A VIDEO SCREEN IN A WAGERING GAME EVENT

RELATED APPLICATION DATA

The present application claims priority from U.S. Provisional Application Ser. No. 62/310,982, filed 21 Mar. 2016.

BACKGROUND OF THE INVENTION

1. Field of the Invention

The present invention relates to the field of gaming, gaming apps, gaming events on electronic platforms and gaming events based on random symbols that are moveable by player selection.

2. Background of the Art

In the few years since their introduction, portable computing devices (e.g., smartphones, music players, and tablet computers) have transitioned from novelties to near-necessities. With their widespread adoption has come an explosion in the number of software programs ("apps") available for such platforms. Over 500,000 apps are now available from the Apple iTunes store alone.

Many apps concern gaming or game play content. Some are designed to provide on-demand playback of audio or video content, e.g., television shows. Others serve to complement media content, such as by enabling access to extra content (behind-the-scenes clips, cast biographies and interviews, contests, games, recipes, how-to videos), by allowing social network-based features (communicating with other fans, including by Twitter, Facebook and Foursquare, blogs), etc. In some instances a media-related app may operate in synchrony with the audio or video content, e.g., presenting content and links at time- or event-appropriate points during the content.

It is difficult for apps to gain traction in this crowded marketplace. Searching iTunes, and other app stores, is the most common technique by which users find new apps for their devices. The next most popular technique for app discovery is through recommendations from friends. Both approaches, however, were established when the app market was much smaller, and have not scaled well.

In the case of the My Generation iPad app, for example, the show's producers must reach out to the target audience and entice them to go to the app store, where they must type in the title of the app, download it, install it, and then run it when the television program is playing.

In accordance with certain embodiments of technology, a different solution is provided. In one such embodiment, a microphone-equipped user device samples ambient content, and produces content-identifying data from the captured audio. This content-identifying data is then used to look-up an app recommended by the proprietor of the content, which app is then installed and launched—with little or no action required by the user. By such arrangement, the content effectively selects the app. The user doesn't select the software; the user's activity selects the software. Over time, each user device becomes app-adapted to the content preferences of the user—thereby becoming optimized to the user's particular interests in the content world.

To some degree, this aspect of technology is akin to the recommendation features of TiVo, but for apps. The user's content consumption habits (and optionally those of the user's social network friends) lead the device to recommend apps that serve the user's interests.

Desirably, it is artists that are given the privilege of specifying the app(s) to be invoked by their creative works. Many countries have laws that recognize artists' continuing interest in the integrity with which their works are treated (so-called "moral rights"). Embodiments of the present technology serve this interest—providing artists a continuing role in how their art is presented, enabling them to prescribe the preferred mechanisms by which their works are to be experienced. Continuity is provided between the artist's intention and the art's delivery. It is desirable in the gaming industry to introduce new games and support new games on electronic media, and have games that relate to well-known events, characters and non-wagering games and events to attract fans of those non-wagering events.

To enable such wagering activities, US Published Patent Application Document No. 20140298355 (Junghun) enables an Application (APP) operating method, an APP operating device, and an APP output device for supporting the APP operating method that can support the present technology. The APP operating method includes connecting an APP operating device and an APP output device, transmitting, by the APP operating device, APP data corresponding to a plurality of APPs being executed in the APP operating device to the APP output device, and outputting, by the APP output device, a plurality of APP areas respectively corresponding to the APP data.

t is desired to create additional apps that relate to or involve well-known and well-liked non-wagering content (celebrities, sports teams, games, shows, music and the like) to provide wagering events that channel the well-know or well-liked content.

SUMMARY OF THE INVENTION

A gaming event is executed on electronic gaming media. A wager is accepted by a processor and a random selection of both virtual symbols and moves is provided to a player by a display screen on a wagering device. The virtual symbols are randomly arranged on a grid having columns and rows. The player inputs commands to the processor to switch individual pairs of adjacent virtual symbols, one pair switched in each available move, until moves are exhausted. A final arrangement of virtual symbols on the grid is evaluated according to paylines and paytables to resolve the wager. An undo button, which specifically removes the last entry and/or all entries is provided on the housing or handheld device,

BRIEF DESCRIPTION OF THE FIGURES

FIG. 1A is an illustrative system for implementing a mobile app wagering event.

FIG. 2A (is a chart indicating that software may be based on one or more contextual factors.

FIG. 6 is a third screen shot of a beginning option in one mode of execution of a wagering event according to the present invention.

FIG. 7 is a fourth screen shot of a beginning option in one mode of execution of a wagering event according to the present invention.

FIG. 8 is a fifth screen shot of a beginning option in one mode of execution of a wagering event according to the present invention.

FIG. 9 is a sixth screen shot of a beginning option in one mode of execution of a wagering event according to the present invention.

DETAILED DESCRIPTION OF THE INVENTION

Figure 1:
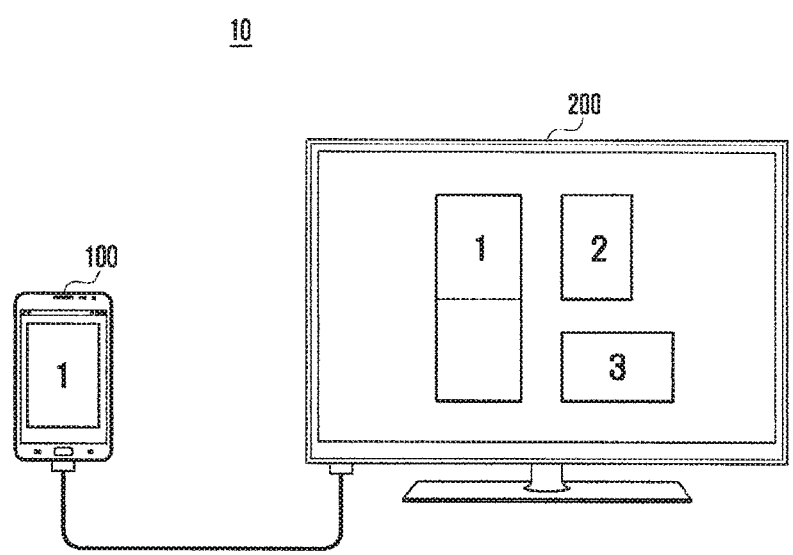
FIG. 1 illustrates a schematic configuration of an Application (APP) operating system according to an embodiment of the present disclosure.

A method is provided for performing a gaming event on virtual symbols displayed on a display screen, the gaming event being:
- A) effectuated by a plurality of programmatic instructions stored in a non-volatile memory, either remote or local to client devices and servers, and
- B) executed by processors at the client devices or servers.

The method includes the steps of:
- C) providing a gaming application downloaded onto a mobile device, or stored in memory associated with a processor in an electronic gaming system (e.g., video slot system, with player input controls, value-in-value-out functions, video display, processor and memory associated with the processor) and possibly for use on a mobile platform;
- D) providing a database (in a central server or in the memory of the electronic gaming system) of virtual symbols and arrangements of symbols on a virtual grid format of multiple columns and multiple rows of frames;
- E) enabling an initiating user with the downloaded gaming application to place value at risk on an outcome of a gaming wager ultimately determined by predefined outcomes of virtual symbol distribution on the virtual grid;
- F) receiving either: i) a first set of random virtual symbols filling all frames on the virtual grid and a random number of available controlled movements of adjacent pairs of virtual symbols, or ii) an unassigned random second set of symbols that are to be assigned into the virtual grid if the second set of virtual symbols is accepted for resolution of the gaming wager;
- G) upon occurrence of i), the player directing a switch exchange of adjacent virtual symbols by contacting each frame of adjacent virtual symbols, thereby signaling the processor at the client device or server to switch the virtual images in the adjacent frames within the virtual grid, and continuing to direct switch exchanges until all available controlled movements are exhausted, forming a final grid array;
- H) upon occurrence of ii), the player either iii) accepting the second set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the second set of symbols and then the processors at the client devices or servers allowing controlled movements of adjacent pairs of symbols by enabling the user to switch the virtual images in the adjacent frames within the virtual grid, and continuing to direct switch exchanges until all available controlled movements are exhausted, forming a final grid array; or iv) the player declining the second set of symbols by inputting a declination signal to the client devices or servers and then receiving a third set of virtual symbols, the player accepting the third set of virtual symbols, and then the programmatic instructions are executed by the processors at the client devices or servers to randomly distribute the virtual symbols of the second set of virtual symbols into the virtual grid to form a virtual grid with all frames filled with individual ones of the virtual symbols of the third set of symbols and then the processors at the client devices or servers allowing controlled movements of adjacent pairs of symbols by enabling the user to switch the virtual images in the adjacent frames within the virtual grid, and continuing to direct switch exchanges until all available controlled movements are exhausted, forming a final grid array; and
- I) after the final grid array has been formed, the client devices, electronic gaming system or servers resolves the gaming wager against a paytable based upon numbers and/or types of virtual symbols aligned in specific paylines on the grid in the final grid array.

The method may be practiced wherein the gaming event is performed online among members of an online social network and the gaming wager is further resolved by award or virtual non-economic online social network notifications or postable symbols.

In determining payouts against the paytable, some completed lines may be worth more points/credits than others. For example, four red diamonds may pay 10 credits while four green boxes may pay only 2 credits. The final payout may also be altered by the number of lines completed. For example, if only one line of green boxes is completed, the game pays out 2 (credits)×1 (for making 1 line) for a total payout of 2. But, if one line of green boxes and three lines of red diamonds are completed (for a total of four completed lines), the machine may pay (2+10+10+10)×20 for a total of 640 credits. Because it is very difficult to make four lines, the paytable is structured to deliver a suitable reward to players for this rare event. Wagering of value is usually done through a value-in-value-out system such as ticket-in-ticket-out systems (with readers and printers), currency accepting and validation systems (with readers, scanners, etc.), or coin/token acceptors/readers. Smart chip cards, swiping of credi5t or debit cards, and scanning of bar codes (without insertion) may6 also be used to input wagering credit.

The method may be practiced wherein each player has a predetermined time period to identify adjacent virtual symbols that are to be switched, or a controlled movement is lost.

The method may be practiced wherein the virtual symbols comprise at least four different symbols, each symbol having different shapes, sizes and/or colors so that the virtual symbols can be visually distinguished.

The method may be practiced wherein the player receives a first set of random virtual symbols filling all frames on the virtual grid and a random number of available controlled movements of adjacent pairs of virtual symbols, the player exhausts all available controlled movements of adjacent pairs of virtual symbols, and after the final grid array has been formed, the client devices or servers resolves the gaming wager against a paytable based upon numbers and/or types of virtual symbols aligned in specific paylines on the grid in the final grid array.

The method may be practiced wherein after the player receives and accepts the unassigned random second set of symbols, the programmatic instructions are executed by the processors at the client devices or servers to randomly distribute the virtual symbols of the second set of virtual symbols into the virtual grid to form a virtual grid with all frames filled with individual ones of the virtual symbols of the second set of symbols and then the processors at the client devices or servers allowing controlled movements of adjacent pairs of symbols by enabling the user to switch the virtual images in the adjacent frames within the virtual grid, and continuing to direct switch exchanges until all available controlled movements are exhausted, forming a final grid array; and, the client devices or servers resolves the gaming wager against a paytable based upon numbers and/or types of virtual symbols aligned in specific paylines on the grid in the final grid array.

An alternative practice method may include steps wherein after the player receives and declines the unassigned random second set of symbols, the programmatic instructions are executed by the processors at the client devices or servers first provide a third set of virtual random symbols that are then accepted and then to randomly distribute the virtual symbols of the third set of virtual symbols into the virtual grid to form a virtual grid with all frames filled with individual ones of the virtual symbols of the third set of symbols and then the processors at the client devices or servers allowing controlled movements of adjacent pairs of symbols by enabling the user to switch the virtual images in the adjacent frames within the virtual grid, and continuing to direct switch exchanges until all available controlled movements are exhausted, forming a final grid array; and, the client devices or servers resolves the gaming wager against a paytable based upon numbers and/or types of virtual symbols aligned in specific paylines on the grid in the final grid array.

One description of an underlying content and concept of the present technology may include a description as a video gambling game where players are presented with a random arrangement of symbols (and optionally wild cards) on a grid, especially a 4×4 grid (although other variations could include a smaller 2×2, 2×3, 2×4, 2×5, 2×6, 3×3 grids with equal or unequal rows and columns and the like, including or larger than 5×5, 6×6, or 7×7 grids. Players arrange a combination of symbols and wild symbols into matching horizontal, vertical, or diagonal lines on the grid by swapping one symbol with another. The greater the number of lines filled with same/same and wild symbols, the larger the payout on a wager or award in a social environment.

This technology includes a wagering or gambling game that shares strong elements with popular matching/puzzle video games like Bejeweled™ game and Candy Crush Saga™ game in which the object is to align symbols in patterns to earn points and advance the gameplay.

An example of gameplay may include the following:

1. Player makes an ante wager from stored value and is shown a distribution of unarranged shapes/symbols (such as 5 red diamonds, 6 blue circles, 3 brown circles, and 2 green squares), or is given a grid that must be played with each frame filled with a random virtual symbol.

In one alternative format, if the player chooses to play the board presented to them, the player will make an additional wager equal to or greater than the ante and the unarranged symbols will be randomly arranged on the (e.g., a 4×4) grid.

If the player rejects the initial board of unarranged symbols, the game ends and players have the option to make a new ante and start a new game.

It is to the player's advantage to choose to continue on game boards that present a concentration of similar symbols vs. a game board with a more even distribution of symbols. If, for example, the player views that 10 out of 16 symbols are the same, the probability of making multiple paying lines increases. On the other hand, if the game potential perceived with respect to offered symbols, shows few matches, the probability of making multiple paylines decreases.

There are two possible ways that the game could select the number of symbols and arrange the symbols.

Each symbols has a predetermined probability of being randomly selected and a predetermined probability of being placed in any square on the grid.

The initial distribution of symbols and the arrangement of symbols on the grid are randomly selected from a pre-constructed array of many (e.g., thousands, tens of thousands, millions) of symbol distributions and symbol arrangements (templates).

2. If the player makes an additional continuation wager and chooses to play the unarranged distribution of symbols presented to them, the sixteen symbols will then be randomly arranged on a 4×4 grid.

Before play begins, a number of the virtual symbols arranged on the grid may be provided that convert to wild virtual symbols (ranging from zero wild symbols to sixteen wild symbols on the grid). Wild virtual symbols can work with any other virtual symbol to help complete horizontal, vertical, or diagonal four-of-a-kind lines.

Before play begins, the player will be assigned x number of moves that can range from 1 to 20, or even 0. The more squares on the grids (e.g., 64, 49, 36, 25, 16, etc.), the higher the number of moves generally to be more tolerated without assuring a win. The number of moves refers to the number of times the player can move a symbol one grid space in a horizontal, vertical, or diagonal direction, that is, to an adjacent square or frame. The game may be configured so that players have to make every move they are given or the game may allow players to skip excess moves they do not want. The game may also offer players the option to take back or undo one or more of their executed moves in case an error is made. The game may be configured so that if the player wager produces a final arrangement of symbols and a corresponding number of moves such that it is impossible to produce any winning outcome, the number of moves displayed to the player will be zero, informing the player they have lost.

The player may move any virtual symbol one space up, down, left, right, or diagonally on the grid. Each move displaces another virtual symbol which is swapped with the virtual symbol that was moved. Any of the 16 virtual symbols (e.g., on a 4×4 grid) can be moved more than once. Wild symbols may have their movement restricted. On a touchscreen player input system, command entry for the switch may be implemented by touching adjacent virtual symbols, sliding one virtual symbol into a frame with another virtual symbol, touching both adjacent symbols and "twisting" them and the like.

The player may encounter a winning outcome and earns credits (e.g., in a 4×4 grid) for each 4 virtual symbol horizontal, vertical, or diagonal line composed of the same virtual symbols or a combination of four of the same virtual symbols plus wild symbols.

Each completed line results in an award of credits with some virtual symbols paying greater amounts than others (for example four blue circles pays 3 credits while four red diamonds pays 10 credits). If players can complete more than 1 line, the sum of the point-value for the individual lines will be multiplied by a number that increases with each additional lines completed. Other pay variations might include multipliers for completing more than one line of four of the same shape.

The game may also offer various progressive jackpots that are shared among multiple machines. Progressive jackpots will accumulate with each qualifying wager from linked machines until one machine makes the winning conditions.

A player wins the progressive event when one machine linked to the progressive jackpot hits a very rare combination (such as all 16 spaces turning wild). This hit frequency of the jackpot can be adjusted (e.g., by frequency of the event within a full set of templates) to offer very large payouts.

Smaller jackpot wins that pay for specific, more common hands. For example, there may be standing progressive awards for various rare outcomes: 5 diamond lines, 4 square lines, 3 circle lines etc). For example, a bank of machines may be linked to a progressive win of $400 if the player makes 5 lines of 4 diamonds and $300 if a player makes 4 lines of squares. Players would be rewarded for recognizing that certain line combinations trigger a progressive award and adjust their strategy accordingly. Special buttons on arrows on a touchscreen may be provided such that the symbol/square to be moved is first highlighted (by touch or cursing click), and then the buttons and/or arrows are contacted to move the highlighted symbols or squares inn a specific direction indicated by the arrows or buttons, as opposed to allowing only a finger swipe on the touch screen to direct the movement of the symbols or squares.

In another version, the winning jackpot combination would be randomly selected and given a finite time period to hit. For example, the dynamic strategy progressive reveals to players on a linked bank of 10 machines that the first player to make a combination of three completed lines of diamonds in the same game will be awarded a progressive win of $50. A timer of 10 minutes will count down how long this progressive award is available. Players would adjust their game strategy to improve their chances of hitting the requirements for the progressive award.

Referring to FIG. 1A, an illustrative system 12 for implementing a mobile app wagering event of the present technology may include a device 14 having a processor 16, a memory 18, one or more input peripherals 20, and one or more output peripherals 22. System 12 may also include a network connection 24, and one or more remote computers 26.

An illustrative device 14 is a smartphone or a tablet computer, although any other consumer electronic device can be used. The processor can comprise a microprocessor such as an Atom or A4 device. The processor's operation is controlled, in part, by information stored in the memory, such as operating system software, application software (e.g., "apps"), data, etc. The memory may comprise flash memory, a hard drive, etc.

The input peripherals 20 may include a camera, buttons, contact switch, pressure switch and/or a microphone. The peripherals (or device 14 itself) may also comprise an interface system by which analog signals sampled by the camera/microphone are converted into digital data suitable for processing by the system. Other input peripherals can include a touch screen, keyboard, etc. The output peripherals 22 can include a display screen, speaker, etc. The network connection 24 can be wired (e.g., Ethernet, etc.), wireless (WiFi, 4G, Bluetooth, etc.), or both.

In an exemplary operation, device 14 receives a set of digital content data, such as through a wireless interface, through the network connection 24, or otherwise. The content data may be of any type, but video content is required at a minimum, and audio is exemplary of additional content.

The system 12 preferably processes the digital content data to generate corresponding identification data. This may be done, e.g., by applying a password, digital watermark decoding process, or a fingerprinting algorithm—desirably to data representing the sonic or visual information itself, rather than to so-called "out-of-band" data (e.g., file names, header data, etc.). The resulting identification data serves to distinguish the received content data from other data of the same type (e.g., other audio or other video).

By reference to this identification data, the system determines corresponding software that should be invoked and even open access to an online account that can be accessed by the player/user on the device. One way to do this is by indexing a table, database, or other data structure with the identification data, to thereby obtain information identifying the appropriate software. An illustrative table is shown conceptually in FIG. 2A.

In some instances the data structure may return identification of a single software program. In that case, this software is launched—if available. (Availability does not require that the software be resident on the device. Cloud-based apps may be available.) If not available, the software may be downloaded (e.g., from an online repository, such as the iTunes store or an online wagering company), installed, and launched. (Or, the device can subscribe to a software-as-service cloud version of the app.) Involvement of the user in such action(s) can depend on the particular implementation: sometimes the user is asked for permission; in other implementations such actions proceed without disturbing the user.

Sometimes the data structure may identify several different software programs. The different programs may be specific to different platforms, in which case, device 12 may simply pick the program corresponding to that platform (e.g., Android G2, iPhone 4, etc.). Or, the data structure may identify several alternative wagering programs that can be used on a given platform. In this circumstance, the device may check to determine which—if any—is already installed and available. If such a program is found, it can be launched. If two such programs are found, the device may choose between them using an algorithm (e.g., most-recently-used; smallest memory footprint; etc.), or the device may prompt the user for a selection. If none of the alternative programs is available to the device, the device can select and download one—again using an algorithm, or based on input from the user. Once downloaded and installed, the application is launched.

Sometimes the data structure may identify different programs that serve different functions—all related to the content. One, for example, may be an app for discovery of hints or suggestions for moves within the game. Another may be an app for purchase of the content (e.g., pay for a hint, especially if the display provides a signal that a "better move" is available. Again, each different class of software may include several alternatives.

Note that the device may already have an installed application that is technically suited to work with the received content (e.g., to render an active video file, operate a preapproved or licensed gaming content, MPEG4 or an MP3 file). For certain types of operations, there may be dozens or more such programs that are technically suitable. However, the content may indicate that only a subset of this universe of possible software programs should be used.

Software in the device 14 may strictly enforce the content-identified software selection. Alternatively, the system may treat such software identification as a preference that the user can override. In some implementations the user may be offered an incentive to use the content-identified software. Or, conversely, the user may be assessed a fee, or other impediment, in order to use software other than that indicated by the content.

Sometimes the system may decline to render certain content on a device (e.g., because of lack of suitable app or hardware capability), but may invite the user to transfer the content to another user device that has the needed capability, and may implement such transfer.

Instead of absolutely declining to render the content, the system may render it in a limited fashion. For example, a video might be rendered as a series of still key frames (e.g., from scene transitions). Again, the system can transfer the content where it can be more properly enjoyed, or—if hardware considerations permit (e.g., screen display resolution is adequate)—needed software can be downloaded and used.

As shown by the table of FIG. 2A (which data structure may be resident in the memory 18, or in a remote computer system 26), the indication of software may be based on one or more contextual factors—in addition to the content identification data. (Only two context factors are shown; more or less can of course be used.)

One formal definition of "context" is "any information that can be used to characterize the situation of an entity (a person, place or object that is considered relevant to the interaction between a user and an application, including the user and applications themselves." Another is the allowable or active state of the gaming event, as either a social event or a legal on-line wagering event.

Context information can be of many sorts, including computing context (network connectivity, memory availability, processor type, CPU contention, etc.), user context (user profile, location, actions, preferences, nearby friends, social network(s) and situation, etc.), physical context (e.g., lighting, noise level, traffic, etc.), temporal context (time of day, day, month, season, etc.), history of the above, etc.

In the illustrated table, rows 32 and 34 correspond to the same content (i.e., same content ID), but they indicate different software should be used—depending on whether the user's context is indoors or outdoors. (The software is indicated by a 5 symbol hex identifier; the content is identified by 6 hex symbols. Identifiers of other forms, and longer or shorter in length, can of course be used.) Row 36 shows a software selection that includes two items of software—both of which are invoked. (One includes a further descriptor—an identifier of a gaming event video that is to be loaded by software "FF245.") This software is indicated for a user in a daytime context, and for a user in the 20-25 age demographic.

Row 38 shows user location (zip code) and gender as contextual data. The software for this content/context is specified in the alternative (i.e., four identifiers "OR"d together, as contrasted with the "AND" of row 36). Rows 40 and 42 show that the same content ID can correspond to different codecs—depending on the device processor (Atom or A4).

(By point of comparison, consider the procedure by which codecs are presently chosen in an exemplary-only manner. Typically the user isn't familiar with technical distinctions between competing codecs, and the artist has no say. Codec selection is thus made by neither party that is most vitally interested in the choice. Instead, default codecs come bundled with certain media rendering software (e.g., Windows Media Player). If the defaults are unable to handle certain content, the rendering software typically downloads a further codec—again with no input from the parties most concerned.)

It will be understood that the software indicated in table 30 by the content can be a stand-alone app, or a software component—such as a codec, driver, etc. The software can render the content, or it can be a content companion—providing other information or functionality related to the content. In some implementations the "software" can comprise a URL, or other data/parameter that is provided to another software program or online service (e.g., a YouTube video identifier).

All such software identified in the table may be chosen by the proprietor (e.g., game designer, layout artist, content creator or copyright-holder) of the content with which it is associated. This affords the proprietor a measure of artistic control that is missing in most other digital content systems. (The proprietor's control in such matters should be given more deference than, say, that of a content distributor—such as Double Deal™ internet gaming, AOL or iTunes. Likewise, the proprietor's choice seems to merit more weight than that of the company providing word processing and spreadsheet software for the device.)

The popularity of content can lead associated software to become similarly popular, which is why the ambience of the present game may channel a feel like that of the popular "Candy Crush"™ on-line game. This can induce other content proprietors to consider such software for use with their own content, since wide deployment of that software may facilitate consumer exposure to the other proprietor's content.

(The software indicated in table 30 may be changed over time, such as through the course of a games's release cycle. When a new symbol image becomes desirable (as by modifying the game to holiday-reflective content), the table-specified software may include an app intended to introduce the new symbols to the public. After the gaming format has become popular and the game has become better known, a different software selection may be indicated.)

Presently, game discovery and other content-related applications are commonly performed by application software. Operating system (OS) software provides a variety of useful services—some of which (e.g., I/O) are commonly used in content-related applications. However, commercial OS software has not previously provided any services specific to content processing or identification. In accordance with a further aspect of the present technology, operating system software is provided to perform one or more services specific to content processing or identification.

In one particular implementation, an OS application programming interface (API) takes content data as input (or a pointer to a location where the content data is stored), and returns fingerprint data corresponding thereto. Another OS service (either provided using the same API, or another) takes the same input, and returns watermark information decoded from the content data. (An input parameter to the API can specify which of plural fingerprint or watermark processes is to be applied. Alternatively, the service may apply several different watermark and/or fingerprint extraction processes to the input data, and return resultant information to the calling program. In the case of watermark extraction, the resultant information can be checked for apparent validity by reference to error correction data or the like.)

The same API, or another, can further process the extracted fingerprint/watermark data to obtain XML-based content metadata that is associated with the content (e.g., text giving the title of the game, the name of the provider or designer, the intellectual property holder, etc.). To do this it may consult a remote metadata registry, such as maintained by a distal third party.

Such a content-processing API can establish a message queue (e.g., a playing/wagering queue) to which results of the fingerprint/watermark extraction process (either literally, or the corresponding metadata) are published. One or more application programs can monitor (hook) the queue—listening for certain identifiers. One app may be to alert to sizes of wagers, length of time in which gaming is active, and other relevant gaming information. When such content is detected, the monitoring app—or another—can launch into activity—logging the event, acting to complement the media content, offering a buying opportunity, offering side bets, offering a progressive jackpot wager, etc. Alternatively, such functionality can be implemented apart from the operating system. One approach is with a subscription model, by which some apps publish capabilities (e.g., looking for a particular type of gaming content event). By these arrangements, loosely-coupled applications can cooperate to enable a similar ecosystem.

One application of the present technology is to monitor media to which a user is exposed—as a background process. That is, unlike song identification services such as Shazam, the user need not take any action to initiate a discovery operation to learn the identity of a particular game or related game, but may request on-line transfer to that related game. (Of course, the user—at some point—must turn on the device, and authorize this background functionality.) Instead, the device listens for a prolonged period—much longer than the 10-15 seconds of Shazam-like services, during the course of the user's day. As content is encountered, it is processed and recognized. The recognition information is logged in the device, and is used to prime certain software to reflect exposure to such content—available the next time the user's attention turns to the device.

In some implementations the device can prime software applications with information that is based, at least in part, on the content identification data. This priming may cause an associated app to show a thumbnail corresponding to a gaming video for a game identified as similar by the processor or the player, readying it for selection. Likewise, a 90 second sample video clip may be downloaded to the iPod music player app—available in a "Recent Encounters" folder. An email from the game designers might be added to the user's email InBox. Such data is resident locally (i.e., the user needn't direct its retrieval, e.g., from a web site), and the information is prominent to the user when the corresponding app is next used—thereby customizing these apps per the user's content experiences.

Social media applications can serve as platforms through which such information is presented, and shared. The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

For purposes of this application, a social network is an on-line community defined by a first set of data, organized into an account in a mobile application or a set of web pages, that are controlled by and defining the interests, profile, images, video, audio, or other information of a first user (collectively first user data), and a second set of data, organized into an account in a mobile application or a set of web pages, each controlled by and defining the interests, profile, images, video, audio, or other information of a second user (collectively second user data), where the first user can selectively grant to the second user access to the first user data and/or where the second user can selectively grant to the first user access to the second user data. It should be appreciated that the selective granting of data access can be applied by any number of first users by and among any number of second users. It should further be appreciated that when a first user grants to the second user access to the first user data, the first user is "connected" to the second user.

For purposes of this application, a mobile platform is an operating system programmed to execute on a mobile device, such as a phone or tablet computer, and connect with a remotely hosted e-commerce store for enabling a user to access a plurality of applications. The operating system defines a plurality of procedures, calls, methods, and other programmatic tools which, if adopted and integrated into the applications, permit the application to be purchased, downloaded, and used on the mobile device.

Both the mobile platform and social network are further defined in that they provide users with a single point of purchase functionality. Even though each may provide access to thousands of products and services, primarily software of different types from different vendors, they provide users with a single point of purchase functionality that is typically actuated by just inputting an identifier, unique to the user of the mobile platform or social network, which triggers a purchase process by authorizing the use of a stored set of billing processes, such as a bank withdrawal or credit card charging process. In this manner, a user of the mobile platform or social network need not engage with multiple different billing systems or re-input billing information every time the user wishes to purchase a software application from a new or different vendor. The mobile platform and social network provide a single purchase functionality that is integrated into the software for hosting the social network and its e-commerce store and integrated into the software for the mobile device operating system and its remotely hosted e-commerce store.

For purposes of this application, a mini-game is any digital content which can be interacted with by a first user to create a challenge for a plurality of second users. A mini-game differs from a conventional wagering game or gaming event in that it typically only includes a single level, a single life, and/or a single interaction screen and is designed to obtain an output which is reformatted as a challenge to a plurality of second users, without placing value at risk. The term mini-game may include abbreviated versions of conventional games such as question and answer games, chain games, fantasy games, arcade games, online video games, bingo, racing games, sporting games, football, baseball, tennis, bowling, ping pong, boxing, basketball, rowing, sailing, shooting, archery, judo, equestrian, gymnastics, wrestling, skiing, hockey, volleyball, cycling, fencing, golf, dominoes, baccarat, word games, crosswords, Scrabble, role play, casino games, roulette, craps, dice games, canasta, chess, checkers, simulation games, mah Jong, any card games, including poker, all fives, blackjack, old maid, bridge, pai gow, rummy, 21, crazy eights, or cribbage, or any variations thereof.

It should be appreciated that all of the gaming systems described herein are operated by hosting servers, executing programmatic code, communicating in a wired or wireless manner with programmatic code on a client device being operated by a user, such as a mobile phone, tablet computer, personal computer, laptop or other computing device.

In an embodiment, the gaming site of the present specification provides users with an option to play one or more wagering events or gaming events or mini-games with one or more virtual opponents via the gaming website, via a social networking website such as Facebook® system, or via a mobile phone operating system, such as Apple® iOS or Google®. Android® systems and the like. In an embodiment, in order to play via a smart phone, a user is prompted to download and install a gaming application by first opening the gaming site on the phone and subsequently clicking on a link provided therein, especially security and verification information components and functions of the gaming events.

In an embodiment, a user may elect to play the game provided by the hosting gaming site via their social network sites such as Facebook® system. In an embodiment, a user may perform a search for the gaming application on his/her Facebook® system page and commence gameplay via opening the application, while still being on Facebook® system. This feature allows the user to play with one or more of his/her Facebook® system friends that happen to be online at that time by inviting such friends to play. The invite may be sent to the accounts or profile pages of friends. The user may also post updates on his/her homepage notifying everyone, or his/her friends, a time and date when the user would be playing the online game, thereby allowing other individuals to join the user's game at the notified times.

While accessing the gaming application via a social networking site, such as Facebook® system, a user is informed that the application would be accessing the user's basic information which may be made available by the networking site. The online gaming system of the present specification uses this basic information, such as the user's name and photo, as well as the user's friends list in order to enable the user to see and play with online friends. The gaming application also requests permission to send emails to the user by using the email provided by the user to the networking site, in order to send the user alerts on the receipt of gifts, neighbor invitations, and occasionally information on new features, games and special offers, including virtual goods. The user may specify whether the application can send e-mails. Further the user may change the permission granted at any time. The gaming application also requests permission to post to the user's profile page (or 'wall') on the networking site for sharing gaming information and rewards with friends. The user may specify whether the application can make such postings. In addition, the user is informed that the gaming application may access the user's profile information provided on the networking site. For example, the gaming application may obtain the user's birth date from the profile information provided to ensure that the user receives age-appropriate content from the gaming application.

The user may also choose to play a mini-game (e.g., non-wagering or social app) selected from a set of games hosted by the gaming website via the website itself. In this case, the user is required to log-in to a social network from within the gaming site, in order to enable play, gift-sharing, etc. with his/her friends. In one embodiment, if a user does not have an account on any social networking site, the user is prompted to create one prior to commencing gameplay.

Architecture Overview—In one embodiment, the online gaming system of the present specification provides a user, which may be an individual, a company, a partnership, a charity, or any other legal entity, with an option of initiating certain mini-games that, when played, increase or expand the number of individuals that are part of the users' social network. That social network is visually described as a tree, but it may take any form that has some element of hierarchy embedded within it where an initiating user (the trunk, community owner, or social network owner) is at the base and other members are either directly connected to the initiating user or indirectly connected to the initiating user through other users.

In one embodiment, the tree trunk represents the player that initiates the game, also known as the first user or the initiating user. In one embodiment, branches, also known as a second (or third, fourth, etc.) user or one who was invited to play the game by the another user, represent all players that choose to progress in the game by receiving and engaging in a mini-game challenge from another user and distributing mini-game challenges to another set of users. In another embodiment, leaves represent all players that choose to remain in the game by receiving and engaging in a mini-game challenge from another user but not distributing any challenges from mini-games themselves. In one embodiment, branches and limbs are used interchangeably. In one embodiment, several trees, or several communities, form a forest.

Mini-games and wagering event gaming may comprise multiple different types of content, as described above, and, within each type of content, multiple different formats. A format may comprise of several types of media, including but not limited to text, audio, images, or video media. In one embodiment, the content is a question and answer game that is passed along among the "initiating player" and "subsequent players". Thus, the content may comprise multiple different formats, including a multiple game content selector, multiple choice selections of virtual symbols (i.e. text, video and/or audio) or a series of images. An "initiating user" can select from many different types of content and corresponding formats through which their game is entered and for subsequent players to engage in. In addition, within each content type, there are several themes, which are genres or sub-genres. Different types of content, formats, symbol themes, and game themes are described below. While throughout this text, examples are provided with respect to "questions", it should be noted that this is for illustrative and descriptive purposes only and that any content type of any format may be used with the present invention as described in the present specification.

FIG. 1 is a flowchart illustrating the general flow between participants in the mini-game described in the present specification. In step 102, a user (also referred to as an "initiating user") requests to initiate a mini-game and creates a challenge for other users/players. The request may take the form of the user signing into the game, the user accessing the gaming site via their electronic device, and/or the user selecting a button or other indicator to start the game. For a first time user, they may be routed to a sign-up screen. If the user is a return user that has already logged in, then they will be taken to the home screen. In response to the request, in step 104, the system presents an initiating user with a first piece of content, in at least one of a plurality of formats, as described below, thereby starting the social network hierarchy.

In one embodiment, in step 106, the initiating user inputs their response to the first piece of content or first question, where the response generally relates to the initiating user. The first piece of content or first question is modified in accordance with that response, for subsequent users to answer. In one embodiment, and described in greater detail below, the response is format dependent. For example, the response may be a personal answer to a question, a preference, an opinion, a time score value or any other response appropriate to the format. For example, in a puzzle mini-game, the response may include something such as the "time to beat". If the response is something in the nature of "time to beat" then a "correct" response to that content would be a better time value (i.e. a shorter time spent to beat the game challenge).

The present specification may provide to a first user (the initiating user) a plurality of mini-games which that user can use to create a social network hierarchy which permits that first user to connect with and/or communicate directly with, all individuals within that social network hierarchy. Further, it should be noted that this hierarchy can be through dozens, hundreds, thousands, and an infinite number of levels, all of which may be communicated to or with by the initiating user. There is no requirement that this hierarchy be linear, in fact, as represented by the example of a tree, it can contain several branches and limbs all stemming from the initiating user.

When any player invites a subsequent player to become part of the social network hierarchy, the subsequent player has the choice of whether to opt-in. While a first player may personally know the initiating user, and responds to the content (and in this example, question) with the knowledge that he will be in that initiating user's network when he engages in the game, this may not be true for subsequent users such as the third player, fourth player, etc. That person may not know the initiating user and may not want to be part of their mini-game community. Thus, in one embodiment, an opt-in is provided. It should be noted herein that each mini-game and its participants form a "social network" or "community" and that these terms may be used interchangeably.

In step 110, the first player(s) is prompted to answer the modified first piece of content or question that is presented to them. If a first player(s) responds to the modified content (or answers the first question) correctly based upon the initiating user's personal response, in step 112, the first player(s) is prompted to input their response to the original content (in one embodiment, the original first question), or a new piece of content (in one embodiment, a second question) which may be selected in the same manner as described above, and in step 114, send that modified first question or modified new content (a second question) to one or more of his or her members (a second set of one or more receiving users, also referred to as second player(s)) to which he or she is connected on one or more social networking sites, so that the second player(s) can answer that question. The second set of one or more receiving users may be selected by the first player(s), may be randomly selected from the first player(s)'s list of friends or contacts, and/or may be selected from the first player(s)'s established followers or fans, as indicated within the gaming system. In a wagering format, individual players may agree to contribute to a pot or jackpot, and the pot is distributed among the players according to a standing on points, wins and the like. The distal processor/server may (where legal) take a commission from the pot for managing the gaming event.

Thus, the second player(s) receive(s) the content when the gaming site presents the first player's challenge, as described above in step 114, to be responded to by the second player(s). Alternatively, multiple pieces of additional content (or multiple second questions, in one embodiment) can be selected and sent out to multiple second players from, by, or on behalf of the first player(s). In step 116, the second player(s) is prompted to respond to the content presented to them. Content that is correctly responded to enables the second player responding to the content to forward that content to a second set of one or more receiving users (or third player(s)), in the same manner described above. The goal of the mini-game is to keep the community growing as long as possible, from the initiating user to nth player(s).

Referring to FIG. 1 (from US 20140298355), an APP operating system 10 of the present disclosure may include an APP operating device 100 and an APP output device 200. The APP operating system 10 having the above-mentioned configuration may output APP data of at least one APP executed in the APP operating device 100 through the APP output device 200. According to various embodiments of the present disclosure, during the process of outputting APP data of at least one APP executed in the APP operating device 100 through the APP output device 200, the APP output device 200 may output APP data of at least some of APPs being executed in the APP operating device 100.

For example, assuming that five APPs are being operated in the APP operating device 100, APP data for at least one of the five APPs may be output through the APP output device 200. The APP operating device 100 may output at least one running APP on the top layer while operating the five APPs and may support operation of the corresponding APPs in an execution status according to a user input. The APP operating device 100 may maintain at least one APP in an activation status through background processing.

According to various embodiments of the present disclosure, the execution status may include at least one of a status in which the APP can be controlled according to an input signal in the APP operating device 100 and a status in which the APP is output on the top layer. The activation status may be a status in which the APP is not output on the top layer of a screen, or the APP is not operated according to an input signal although having been loaded in a memory. Among the APPs in the activation status, the APP having a widget function may be changed from the activation status to an execution status according to setting information. According to various embodiments of the present disclosure, the APPs in the activation status may be changed to the execution status by a user designation. Hereinafter, a memory may be an area in which information is recorded by a controller 160 or data stored in a storage unit 150 is loaded. For example, the memory may be a Random Access Memory (RAM) area, and/or the like. Such a memory may serve as a buffer in some cases.

The APP operating device 100 corresponds to a device that stores at least one APP in the storage unit 150, activates the corresponding APP according to a user request, and thereafter provides an execution status selectively or in response to the user request. The APP operating device 100 may transmit, to the APP output device 200, APP data for at least one APP during the execution status and the activation status according to a connection of the APP output device 200 or a user control after the connection of the APP operating device 100 to the APP output device 200. If the APP data is updated by operation of the corresponding APP, then the APP operating device 100 may transmit the updated APP data to the APP output device 200.

The APP operating device 100 may control operation of a specific APP according to at least one of an input signal from the APP output device 200 and an input signal from an input unit included in the APP operating device 100. During this process, when the updated APP data is generated, the APP operating device 100 may transmit the corresponding APP data to the APP output device 200. According to various embodiments of the present disclosure, the APP data may include at least one of image data and text data which can be output on a device display unit of the APP output device 200. Various configurations of the APP operating device 100 for supporting an APP operating function according to various embodiments of the present disclosure will be described below more specifically with reference to FIGS. 2 and 3.

The APP output device 200 may be connected to the APP operating device 100 through at least one of wired and wireless connection. The APP output device 200 may receive APP data associated with at least one APP provided by the APP operating device 100 and may output the received APP data to the device display unit. According to various embodiments of the present disclosure, during the process of the APP output device 200 receiving APP data associated with at least one APP provided by the APP operating device 100 and outputting the APP data to the device display unit, in a case in which the APP operating device 100 provides a plurality of APP data, the APP output device 200 may classify the APP data and control such that the APP data is output to the device display unit as an APP area. According to various embodiments of the present disclosure, the APP output device 200 may include the device display unit having a larger display area than that of the APP operating device 100. The APP output device 200 may output the plurality of APP areas in the corresponding display area without the APP areas overlapping each other. Alternatively, even if the APP areas partially overlap each other, the APP output device 200 may provide a proper display space such that a user may easily operate the respective APPs.

Further, the APP output device 200 may display an APP area larger than that displayed in the APP operating device 100 for a specific APP. According to various embodiments of the present disclosure, the APP output device 200 does not simply expand the APP area of the APP operating device 100. According to various embodiments of the present disclosure, the APP output device 200 may provide an expanded area containing more data. For example, if the APP operating device 100 has output a list containing ten items, the APP output device 200 may output a list containing twenty items. During this process, the APP output device 200 may also provide, for the twenty items, areas equal to or larger than those assigned to the respective items in the APP operating device 100.

Meanwhile, the APP output device 200 may include a device input unit. The APP output device 200 may transmit an input signal for a control of an APP operation, which is input through the device input unit, to the APP operating device 100. When receiving APP data updated by the transmitted input signal, the APP output device 200 may update displaying of an APP area related to the corresponding updated APP data. Configurations of the above-described APP output device 200 and functions thereof will be described below more specifically with reference to FIGS. 4 and 5.

According to various embodiments of the present disclosure, while providing the above-described functions, the APP operating system 10 may perform more diverse control for the APPs operated in the APP operating device 100 through the APP output device 200. Further, the APP operating system 10 transmits a user control using the APP output device 200 to the APP operating device 100 and allows the user control to be performed for the corresponding APP. Accordingly, even in the APP output device 200, the user may freely operate at least one APP installed in the APP operating device 100. Meanwhile, the APPs in the above description are various APPs provided by the APP operating device 100 and may include various APPs such as an APP in an activation or execution status according to a user selection and an APP activated at a specific time point according to a user setting. For example, the above-described APPs may include at least one of a dial input APP for a telephone call, an audio file or video file reproducing APP, a file editing APP, a broadcast receiving APP, a gallery APP, a chatting APP, an alarm APP, a calculator APP, a phonebook APP, a schedule APP, a calendar APP, and/or the like.

Figure 2:
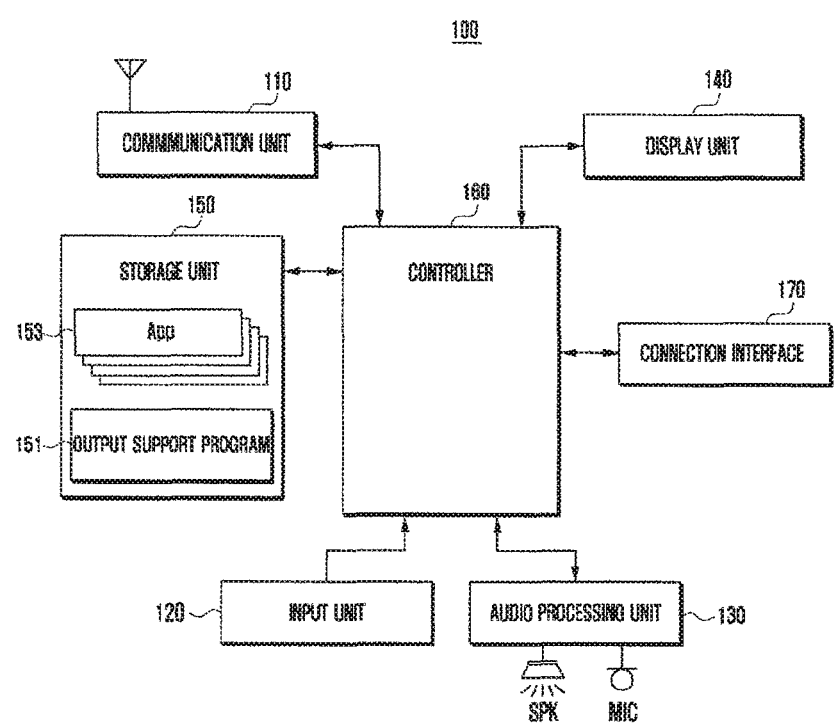
FIG. 2 is a block diagram illustrating an APP operating device according to an embodiment of the present disclosure.

FIG. 2 is a block diagram illustrating an APP operating device according to an embodiment of the present disclosure.

Referring to FIG. 2, the APP operating device 100 may include a communication unit 110, an input unit 120, an audio processing unit 130, a display unit 140, a storage unit 150, and a controller 160. According to various embodiments of the present disclosure, the APP operating device 100 may further include a connection interface 170. In addition, the APP operating device 100 may also further include an image sensor for image collection according to a design method. Moreover, the APP operating device 100 may also further include various sensors as an input device such as an acceleration sensor or a proximity sensor, a motion sensor such as a gyro sensor, an illumination sensor, and/or the like.

Meanwhile, the connection interface 170 corresponds to an interface to which at least one APP output device 200 can be connected. For example, a smart TV, a smart monitor or another electronic device (e.g., terminal) may be connected to the connection interface 170 of the APP output device 200. The APP output device 200, which will be described below, may include various input units such as a keyboard, a mouse, an electronic pen, a remote controller, and/or the like as a device input unit. Accordingly, the connection interface 170 may not only output APP data related to at least one APP to the APP output device 200 but may also transfer an input signal generated by the APP output device 200 to the controller 160. In this case, the connection interface 170 may perform both an output function of outputting APP data of the APP operating device 100 to the APP output device, and an input function of transferring a user input signal collected by the APP output device to the controller 160.

The communication unit 110 supports a communication function of the APP operating device 100. The communication unit 110 supports formation of at least one communication channel for supporting APPs requiring communication among the above-described various APPs as well as a message service function, a webpage search function, a video call function, a voice call function, a data transmission/reception function, a cloud function, and/or the like of the APP operating device 100. The communication unit 110 may include a mobile communication module in a case in which the APP operating device 100 supports a mobile communication function. Further, the communication unit 110 may include a broadcast receiving module in a case in which the APP operating device 100 supports a broadcast receiving function. If the communication unit 110 forms a specific communication channel and receives data through the corresponding communication channel, then the received data may be provided to the controller 160. The controller 160 may provide the corresponding data to the corresponding APP to support an APP operation. According to various embodiments of the present disclosure, APP data provided for the corresponding APP operation may also be provided to the APP output device 200.

The input unit 120 generates various input signals required for operation of the APP operating device 100. The input unit 120 may be formed in the shape of a specific key such as a button key, a side key, a home key, and/or the like. While one APP is in an activation status, the input unit 120 is operated as a configuration for generating an input signal for operation of the corresponding APP. If an input signal generated by a push of the input unit 120 is transferred to the controller 160, then the controller 160 may provide the corresponding input signal to a running APP.

Meanwhile, in a case in which the display unit 140 is provided in the form of a touch screen supporting a touch function, the input unit 120 may include the display unit 140. A touch event generated through the display unit 140 is transferred to the controller 160, and the controller 160 may apply the touch event to a running APP. If an APP operation is updated by an input signal generated through the input unit 120, then the controller 160 may transfer APP data updated according to the update of the APP operation to the APP output device 200.

The audio processing unit 130 processes various audio signals generated in a process of operating the APP operating device 100. For example, the audio processing unit 130 may include a Speaker (SPK) to support an output of an audio signal generated or decoded in the APP operating device 100, and in addition or in the alternative, may include a Microphone (MIC) configured to collect audio signals so as to support a voice or video call function and a recording function.

Meanwhile, if the APP output device 200 is connected to the connection interface 170, then the audio processing unit 130 may output a guide sound or sound effect corresponding to (or otherwise indicating) the connection. If specific APP data is transmitted to the APP output device 200, the audio processing unit 130 may output a guide sound or effect sound corresponding to the transmission. The above-described function of outputting the guide sound may be omitted or otherwise configured according to a manufacturer design and/or a user selection or preferences.

The display unit 140 outputs various functional screens required during operation of the APP operating device 100. For example, the display unit 140 may display a menu screen, a screen for operating a specific APP, a screen for operating a plurality of APPs, a full screen of a specific APP during operation of a plurality of APPs, and/or the like. According to various embodiments of the present disclosure, the display unit 140 may output an APP operation screen activated according to a user selection. The APP operation screen may be output in a landscape mode or portrait mode on the display unit 140 according to a setting of a user or a setting of the corresponding APP. The APP operation screen output on the display unit 140 may output information updated by an input signal input from the input unit 120 or the device input unit. The updated information as updated APP data may be transferred to the APP output device 200. The various screen interfaces as described above will be described below more specifically with reference to the accompanying drawings.

Meanwhile, the above-described display unit 140 may include a touch panel and a display panel for support of an input function. Further, the display unit 140 may include a pen touch panel for operation of an electronic pen. The touch panel may be a panel, such as a capacitive touch panel, a resistive touch panel, and/or the like capable of detecting a physical or electronical change by a user finger-touch. The touch panel is disposed on a front or rear surface of the display panel and provides, to the controller 160, position information by a user finger touch and gesture information according to a user finger movement. The display panel is an area in which screen elements are output. The display panel is mapped with the touch panel and outputs various screen elements. For example, the display panel may output an operation screen of a specific APP among a plurality of APPs being operated. The pen touch panel is disposed on a front or rear surface of the display panel, recognizes an electronic pen according to proximity of the electronic pen, and provides information according to a movement of the electronic pen to the controller 160. The touch pen panel may be provided in various forms according to characteristics of the electronic pen. For example, the pen touch panel may be formed of an electromagnetic induction type panel. The touch panel and the pen touch panel as described above may be used as the input unit 120 of the APP operating device 100. Meanwhile, in a case in which the APP operating device 100 is designed such that at least one of a finger touch function and a pen touch function is not included, the display unit 140 may be implemented as a configuration in which at least one of the touch panel and the pen touch panel is not included.

The storage unit 150 may store various application programs required for operation of the APP operating device 100 and various APP data generated during the operation of the APP operating device 100. For example, the storage unit 150 may store programs including an operating system required for the operation of the APP operating device 100. More particularly, the storage unit 150 stores various APPs related to user functions, and provides the APPs to the controller 160 in response to a user request such that a function of the corresponding APP may be operated. According to various embodiments of the present disclosure, the storage unit 150 may include a plurality of APPs 153 and may include an output support program 151 as illustrated. Further, the storage unit 150 may include at least one buffer storing APP data generated according to operation of the APPs 153. Meanwhile, in a case in which a predetermined area of the storage unit 150 is not provided as a buffer, a separate buffer may be disposed in the controller 160.

According to various embodiments of the present disclosure, the plurality of APPs 153 are application programs for supporting various functions installed in the APP operating device 100. The plurality of APPs 153 may be provided in the form of an icon or a separate menu item to the display unit 140, or may be activated according to a user request or schedule information while being allocated to hot keys. For example, the plurality of APPs 153 includes the aforementioned various APPs including a voice call APP, a video call APP, a cloud APP, a camera APP, a web connection APP, a game APP, and/or the like. Further, the plurality of APPs 153 may also include a plurality of APPs for similar functions. For example, the plurality of APPs 153 may include a plurality of browser APPs. Further, the plurality of APPs 153 may include a plurality of APPs regarding the camera 170. In addition, the plurality of APPs 153 may include a plurality of APPs for utilization of the APP output device 200. Accordingly, in a case in which the plurality of APPs are activated, the APP operating device 100 may support operation and processing for each of the APPs. More particularly, the APP operating device 100 may apply an input signal to a specific APP and may transfer APP data updated according to the input signal to the APP output device 200.

According to various embodiments of the present disclosure, the output support program 151 is a program for allowing APP data corresponding to at least one APP operated in the APP operating device 100 to be output through the APP output device 200. The output support program 151 may include a routine for loading at least one APP having received a request for activation in a memory, for example, a RAM, a routine for executing a designated specific APP among the loaded APPs, loading an operation screen of the executed APP in a frame memory or a frame buffer, and outputting the operation screen of the executed APP to the display unit 140, and/or the like. The frame memory or the frame buffer is a storage area allocated to the display unit 140 and may be differentiated from a memory provided for the storage unit 150 and the controller 160.

According to various embodiments of the present disclosure, the output support program 151 may include a routine for determining a connection of the APP output device 200, a routine for transmitting APP data of at least some of APPs activated according to a setting or automatically to the connected APP output device 200, and/or the like. The output support program 151 may include a routine for receiving an input signal for operating a specific APP from the APP output device 200, a routine for applying the received input signal to the operation of the corresponding APP, a routine for transmitting APP data updated according to the applying of the input signal to the APP output device 200, and/or the like.

According to various embodiments of the present disclosure, the output support program 151 may include a routine for receiving an input signal from the input unit 120 or the display unit 140 having an input function, a routine for applying the received input signal to an APP displayed on the top layer or a specific running APP among the APPs, a routine for updating an operation screen of the corresponding APP, a routine for outputting the updated APP data to the APP output device 200, and/or the like. The output support program 151 may include a routine for receiving an input signal generated according to a setting, a routine for determining an APP to which the corresponding input signal will be applied, a routine for applying the corresponding input signal to the corresponding APP, a routine for transmitting APP data updated according to the applying of the input signal to the APP output device 200, and/or the like. The output support program 151 may include a routine for applying an input signal generated by the APP operating device 100 to a running APP in the APP operating device 100, a routine for applying an input signal received from the APP output device 200 to an APP outputting APP data to the APP output device 200, a routine for transmitting the corresponding APP data to which the input signal of the APP output device 200 has been applied to the APP output device 200 independently of the APP operation of the APP operating device 100, and/or the like.

According to various embodiments of the present disclosure, the output support program 151 may include a routine for providing APP data to each of a plurality of APP output devices 200 or a routine for distributing the APP data to the plurality of APP output devices 200, a routine for providing APP data according to a landscape or portrait mode for each of APPs to the APP output device 200, a routine for providing, to the APP output device 200, APP data for which a display mode of the corresponding APP is changed according to a signal, received from the APP output device 20, for requesting a change of a landscape or portrait mode, and/or the like. The output support program 151 may include a routine for adjusting an APP area, which will be displayed according to an APP operation, in response to a request of the APP output device 200, a routine for adjusting a display buffer of the corresponding APP according to the change of the APP area, a routine for adjusting data allocation according to the adjustment of the display buffer, and/or the like.

The connection interface 170 is a configuration for a connection with an APP output device which can be connected to the APP operating device 100. The connection interface 170 may support both a wired manner and a wireless manner. Accordingly, the connection interface 170 may include a wired serial connection interface such as a Universal Serial Bus (USB) interface, a Universal Asynchronous Receiver/Transmitter (UART) interface, and/or the like. Further, the connection interface 170 may include a wireless connection interface such as, for example, a Bluetooth connection interface, a Zigbee connection interface, a Ultra WideB and (UWB) connection interface, a Radio Frequency IDentification (RFID) connection interface, an infrared ray connection interface, a Wireless Application Protocol (WAP) connection interface, a Near Field Communication (NFC) connection interface, and/or the like. Namely, the connection interface 170 may include various types of communication connection interfaces that can be connected with the APP operating device 100. The connection interface 170 may include a plurality of ports and a plurality of wireless communication modules for a connection with a plurality of APP output devices as well as a single APP output device 200.

The controller 160 supports processing of various signals and data related to operation of the APP operating device 100. Namely, if the controller 160 receives a request for activation of a specific APP, then the controller 160 performs operation of the specific APP and supports an output of an APP operation screen on the display unit 140. According to various embodiments of the present disclosure, during the process of the controller 160 performing an operation of the specific APP and supporting an output of the APP operation screen on the display unit 140, according to setting information or a user request, the controller 160 may support an adjustment of a size, the number, a display direction, an update of an APP area to be displayed, and/or the like according to the operation of the specific APP and may support a control of the corresponding APP according to an input signal. According to various embodiments of the present disclosure, the controller 160 may include configurations as illustrated in FIG. 3.

Figure 3:
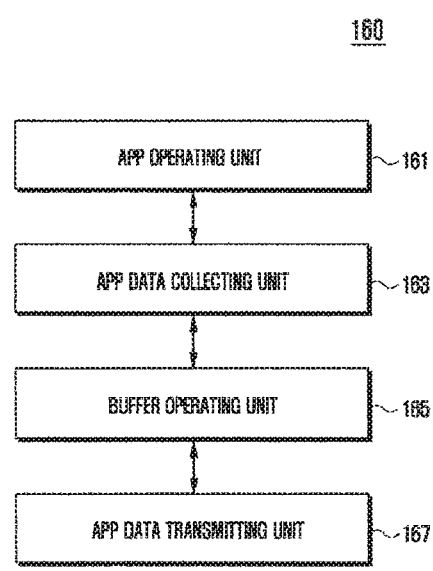
FIG. 3 is a block diagram illustrating a controller of an APP operating device according to the embodiment of the present disclosure.

FIG. 3 is a block diagram illustrating a controller of an APP operating device according to an embodiment of the present disclosure. Referring to FIG. 3, the controller 160 of the APP operating device may include an APP operating unit 161, an APP data collecting unit 163, a buffer operating unit 165, and an APP data transmitting unit 167.

According to various embodiments of the present disclosure, the APP operating unit 161 may support operation of a specific APP selected by an event generated from at least one of the input unit 120 and the display unit 140 supporting the input function or operation of an APP set to be executed by an event generated according to setting information. More particularly, the APP operating unit 161 may support activation of a plurality of APPs according to the event generation. The APP operating unit 161 may support execution of a specific APP among the plurality of APPs according to a user selection or setting. According to various embodiments of the present disclosure, the APP operating unit 161 may support an output of any one of APP data generated according to the APP operation on the full screen of the display unit 140. The APP operating unit 161 may process the remaining APP data in a background. For example, the APP operating unit 161 may control APP data related to APPs in an activation status to be loaded in a memory or a buffer but not output to the display unit 140. The APP operating unit 161 may support an output of only APP data of an APP having received an execution request among the APPs in the activation status to the display unit 140.

According to various embodiments of the present disclosure, the APP operating unit 161 may switch a specific APP from an activation status to an execution status by setting information, and may control APP operation according to the corresponding information. According to various embodiments of the present disclosure, the APP operating unit 161 may not execute the specific APP in the activation status, and may provide, through an interrupt signal form, that an event related to the corresponding APP has been generated.

Meanwhile, if the APP operating unit 161 receives a request for execution of a specific APP from the input device including at least one of the input unit 120 and the display unit 140 supporting the input function, the APP operating unit 161 may support the execution of the corresponding APP. According to various embodiments of the present disclosure, if the APP is in an inactivation status, then the APP operating unit 161 may load the APP in a memory and execute the APP. If the APP is in an activation status, the APP operating unit 161 may switch the APP from the activation status to an execution status and may support an output of APP data according to the operation of the corresponding APP on the display unit 140.

Further, if the APP operating unit 161 receives an input signal for operating the specific APP from the input device or the APP output device 200, then the APP operating unit 161 may control application of the corresponding input signal to the corresponding APP. According to various embodiments of the present disclosure, the APP operating unit 161 may control application of the input signal generated by the input device of the APP operating device 100 to the APP running as a default. The APP operating unit 161 may control the input signal received from the APP output device 200 to be applied to an APP designated by the corresponding input signal. According to various embodiments of the present disclosure, the APP operating unit 161 may control the input signal received from the APP output device 200 to be processed through background processing. Further, the APP operating unit 161 may change a status of the APP designated by the input signal received from the APP output device 200 to an execution status, output the corresponding APP data to the display unit 140, and support application of the input signal.

According to various embodiments of the present disclosure, if the APP operating unit 161 receives an event for a landscape or portrait mode of the APP operating device 100, then the APP operating unit 161 may apply the event to an execution screen. According to various embodiments of the present disclosure, if a landscape mode or portrait mode is designated as a default mode for a specific APP, then the APP operating unit 161 may support maintenance of the corresponding landscape mode or portrait mode irrespective of a horizontal or vertical status (e.g., the orientation) of the APP operating device 100. Further, while a specific APP is being operated in a landscape or portrait mode, if another APP enters an execution status and the running APP is changed to an activation status, the APP operating unit 161 may maintain the landscape or portrait mode shortly before the operation of the corresponding APP.

Accordingly, APP data of the specific APP may be stored in a memory while being maintained in the status in which the specific APP has been executed, for example, in the landscape or portrait mode. Meanwhile, the APP operating unit 161 may change a screen of the specific APP from a landscape mode to a portrait mode or from a portrait mode to a landscape mode in response to a request of the APP output device 200. According to various embodiments of the present disclosure, the four screens of APPs being performed through background processing as well as the screen of the specific APP being output on the display unit 140, the APP operating unit 161 may control a change of a landscape or portrait mode of the APP differentiated by the input signal from the APP output device 200.

The APP operating unit 161 may also apply both the input signal from the input device and the input signal from the APP output device 200 to a single APP. The APP operating unit 161 may sequentially apply the respective input signals to the single APP according to a reception time of the input signals to be transferred.

The APP operating unit 161 may set an output size of a specific APP to be larger than an area of the display unit 140 of the APP operating device 100. For example, assuming that the display unit 140 has a full size of 10.times.10, the APP operating unit 161 may output a screen having a size of 10.times.10 according to the received input signal and may change a size of the running APP to a size of 20.times.20.

According to various embodiments of the present disclosure, the APP operating unit 161 may allocate additional data to the expanded area. The APP operating unit 161 may perform data processing for an area which is not currently displayed on the display unit 140 through background processing to thereby support a data update of the corresponding area. Consequently, the APP operating unit 161 may set the APP screen to have a larger size in the memory, and may perform data writing suitable for the set size of the APP screen. Meanwhile, the APP operating unit 161 may support an output of only the area corresponding to the size of the display unit 140 and may support data updating for the remaining area. The APP operating unit 161 may control a memory allocation size for an adjustment of the above-described APP screen. Namely, the APP operating unit 161 may expand and allocate the memory area to write data having a size larger than the display unit 140.

The APP data collecting unit 163 collects APP data generated while the APP operating unit 161 operates at least one APP. For example, if APP data is recorded in the memory by APPs activated by the APP operating unit 161, then the APP data collecting unit 163 may collect the corresponding APP data. According to various embodiments of the present disclosure, the APP data collecting unit 163 may collect the whole APP data of all APPs recorded in the memory. Alternatively, the APP data collecting unit 163 may also collect only some of the APP data of all the APPs. For example, if five APPs are in an activation status, then the APP data collecting unit 163 may collect the respective five APP data. Alternatively, the APP data collecting unit 163 may collect only some APP data selected to be transmitted to the APP output device 200 among the five APP data.

Meanwhile, if the APP data is updated after the APP data collecting unit 163 collects the respective APP data, then the APP data collecting unit 163 may collect only the updated APP. The respective APP data collected by the APP data collecting unit 163 may be transferred to the APP output device 200 through the connection interface 170. According to various embodiments of the present disclosure, the APP data collecting unit 163 may provide, to the APP output device 200, the APP data including index information or identification information to be differentiated by the APP output device 200. Further, the buffer operating unit 165 may allocate separate distinguishable buffers so as to provide the respective APP data to the APP output device 200. The APP data collecting unit 163 may record the corresponding APP data in the respective buffers to provide the APP data to the APP output device 200. For example, the buffer operating unit 165 may allocate buffers to five APPs, respectively, and the APP data collecting unit 163 may record APP data of the APPs in the respective buffers. According to various embodiments of the present disclosure, during the process of the buffer operating unit 165 allocating buffers for the respective APP data, the buffer operating unit 165 may allocate a new buffer when a new APP is activated, and may withdraw the allocated buffer when the APP in an activation status is terminated.

The APP data transmitting unit 167 may transmit the APP data collected by the APP data collecting unit 163 to the APP output device 200. Further, the APP data transmitting unit 167 may transmit the updated APP data collected by the APP data collecting unit 163 to the APP output device 200. According to various embodiments of the present disclosure, the APP data transmitting unit 167 may control formation of a communication channel with the APP output device 200 connected to the connection interface 170. According to various embodiments of the present disclosure, the APP data transmitting unit 167 may control formation of at least one of a wired communication channel and a wireless communication channel. The APP data transmitting unit 167 may use at least one communication channel for transmission of the respective APP data. For example, the APP data transmitting unit 167 may create at least one of various communication channels including a WiFi communication channel, a USB communication channel, a UART communication channel, a BT communication channel, and/or the like between the APP data transmitting unit 167 and the APP output device 200. The APP data transmitting unit 167 may transmit some of the APP data to the APP output device 200 through a USB communication channel and may transmit other APP data to the APP output device 200 through a BT communication channel. Further, the APP data transmitting unit 167 may transmit the remaining APP data to the APP output device 200 through a WiFi communication channel, a UART communication channel, and/or the like. The technology of U.S. Pat. No. 9,311,167 (Kim) enabling such APPS is also incorporated herein by reference.

The present technology may also be executed as a method or a system for executing that method of operating an Application (APP) on a hand-held telecommunication device with a processor, player input controls and video display therein, the method including: connecting an APP operating device in the hand-held communication device through a wireless connection to an APP output device; transmitting programmatic gaming instructions of a gaming event APP from the APP operating device to the hand-held communication device to be stored in non-volatile memory, the hand-held communication device downloading the gaming APP for access by the processor, wherein the gaming event:
   a) is effectuated by a plurality of programmatic instructions stored in the non-volatile memory in communication with the processor, and
   b) is executed by the processor in the hand-held device by player input through the player input device in communication with the non-volatile memory,
said method including the steps of:
   c) the processor executing the downloaded gaming event APP downloaded;
   d) the processor providing a database of virtual symbols and arrangements of virtual symbols on a virtual grid format of multiple columns and multiple rows of frames from the non-volatile memory;
   e) enabling an initiating user with the downloaded gaming application to initiate a game event based ultimately determined by predefined outcomes of virtual symbol distribution on the virtual grid;
   f) the visual display receiving and displaying either: i) a first set of random virtual symbols filling all frames on the virtual grid and a random number of available controlled movements of adjacent pairs of virtual symbols, or ii) an unassigned random second set of symbols that are to be assigned into the virtual grid if the second set of virtual symbols is accepted for resolution of the gaming wager;
   g) upon occurrence of i), the player directing through the player input controls a switch exchange of adjacent virtual symbols by contacting each frame of adjacent virtual symbols, thereby signaling the processor to switch the virtual images in the adjacent frames within the virtual grid, and continuing to direct switch exchanges until all available controlled movements are exhausted, forming a final grid array;
   h) upon occurrence of ii), the player, through the player input controls, either iii) accepting the second set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the second set of symbols and then the processor allowing controlled movements of adjacent pairs of symbols by enabling the player input controls to switch the virtual images in the adjacent frames within the virtual grid, and continuing to direct switch exchanges until all available controlled movements are exhausted, forming a final grid array; or, through the player input device, iv) the player input controls declining the second set of symbols by inputting a declination signal to the processor and then receiving a third set of virtual symbols, the player input controls accepting the third set of virtual symbols, and then the programmatic instructions are executed by the processors randomly distributing the virtual symbols of the second set of virtual symbols into the virtual grid to form a virtual grid with all frames filled with individual ones of the virtual symbols of the third set of symbols and then the processors allowing controlled movements of adjacent pairs of symbols by enabling the player input controls to switch the virtual images in the adjacent frames within the virtual grid, and continuing to direct switch exchanges until all available controlled movements are exhausted, forming a final grid array; and i) after the final grid array has been formed, the processor resolving the gaming event against a paytable based upon numbers and/or types of virtual symbols aligned in specific paylines on the grid in the final grid array.

The gaming event may require that value is placed at risk on an outcome of a gaming wager, and resolution of the gaming event is based on resolution of the wager against the paytable for value accounted for in the processor.

A method of executing a gaming event on a video gaming system that may include a housing, a processor, a video display, player input controls and a value-in-value-out system for entering wagerable value and withdrawing accrued value from the video gaming system, the processor having game content information stored in non-volatile memory, wherein the gaming event:

a) is effectuated by a plurality of programmatic instructions stored in the non-volatile memory in communication with the processor, and b) is executed by the processor by player input through the player input device in communication with the non-volatile memory, said method including the steps of:

c) the processor providing a database of virtual symbols and arrangements of virtual symbols on a virtual grid format of multiple columns and multiple rows of frames from the non-volatile memory;

d) enabling an initiating player position with the downloaded gaming application to initiate a game event based after placing a wager for value stored in the video gaming system, ultimately determined by predefined outcomes of virtual symbol distribution on the virtual grid;

e) the visual display receiving and displaying either: i) a first set of random virtual symbols filling all frames on the virtual grid and a random number of available controlled movements of adjacent pairs of virtual symbols, or ii) an unassigned random second set of symbols that are to be assigned into the virtual grid if the second set of virtual symbols is accepted for resolution of the gaming wager;

f) upon occurrence of i), the player directing through the player input controls a switch exchange of adjacent virtual symbols by contacting each frame of adjacent virtual symbols, thereby signaling the processor to switch the virtual images in the adjacent frames within the virtual grid, and continuing to direct switch exchanges until all available controlled movements are exhausted, forming a final grid array;

g) upon occurrence of ii), the player, through the player input controls, either iii) accepting the second set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the second set of symbols and then the processor allowing controlled movements of adjacent pairs of symbols by enabling the player input controls to switch the virtual images in the adjacent frames within the virtual grid, and continuing to direct switch exchanges until all available controlled movements are exhausted, forming a final grid array; or, through the player input device, iv) the player input controls declining the second set of symbols by inputting a declination signal to the processor and then receiving a third set of virtual symbols, the player input controls accepting the third set of virtual symbols, and then the programmatic instructions are executed by the processors randomly distributing the virtual symbols of the second set of virtual symbols into the virtual grid to form a virtual grid with all frames filled with individual ones of the virtual symbols of the third set of symbols and then the processors allowing controlled movements of adjacent pairs of symbols by enabling the player input controls to switch the virtual images in the adjacent frames within the virtual grid, and continuing to direct switch exchanges until all available controlled movements are exhausted, forming a final grid array; and h) after the final grid array has been formed, the processor resolving the wager of value the gaming event against a paytable based upon numbers and/or types of virtual symbols aligned in specific paylines on the grid in the final grid array.

i) The method of claim 14 wherein the gaming event requires that value is placed at risk on an outcome of a gaming wager, and resolution of the gaming event is based on resolution of the wager against the paytable for value accounted for in the processor.

j) The method of claim 1, wherein each player has a predetermined time period to identify adjacent virtual symbols that are to be switched, or a controlled movement is lost.

The method may use virtual symbols of at least four different symbols, each symbol having different shapes, sizes and/or colors so that the virtual symbols can be visually distinguished. The player may receive a first set of random virtual symbols filling all frames on the virtual grid and a random number of available controlled movements of adjacent pairs of virtual symbols, the player exhausts all available controlled movements of adjacent pairs of virtual symbols, and after the final grid array has been formed, the client devices or servers resolves the gaming wager against a paytable based upon numbers and/or types of virtual symbols aligned in specific paylines on the grid in the final grid array.

In all methods and apparatus, the processor may identify a specific limit of numbers of symbol exchanges that are allowed in a round of play. That is, a player may be provided with a notice displayed on the visual display or video screen that only X number of exchanges of symbol positions may be allowed in the particular round of the execution of the game. That number X may be a random number (usually between 0-10, 0-6, 0-5 and the like. The number may also have substantive content value with respect to the individual round of game execution. For example, a number of zero means that either the maximum value of positions for the symbols randomly displayed is present on the screen and that further moves are undesirable. The number zero could also indicate that no allowable number of moves can create a winning outcome. A number of 1 (one) can similarly indicate that a single move will achieve a maximum level of outcome according to the paytable. A number of four (4), for example, can indicate that making four exchanges will produce a maximum level of value outcome according to the paytable.

Figure 4:
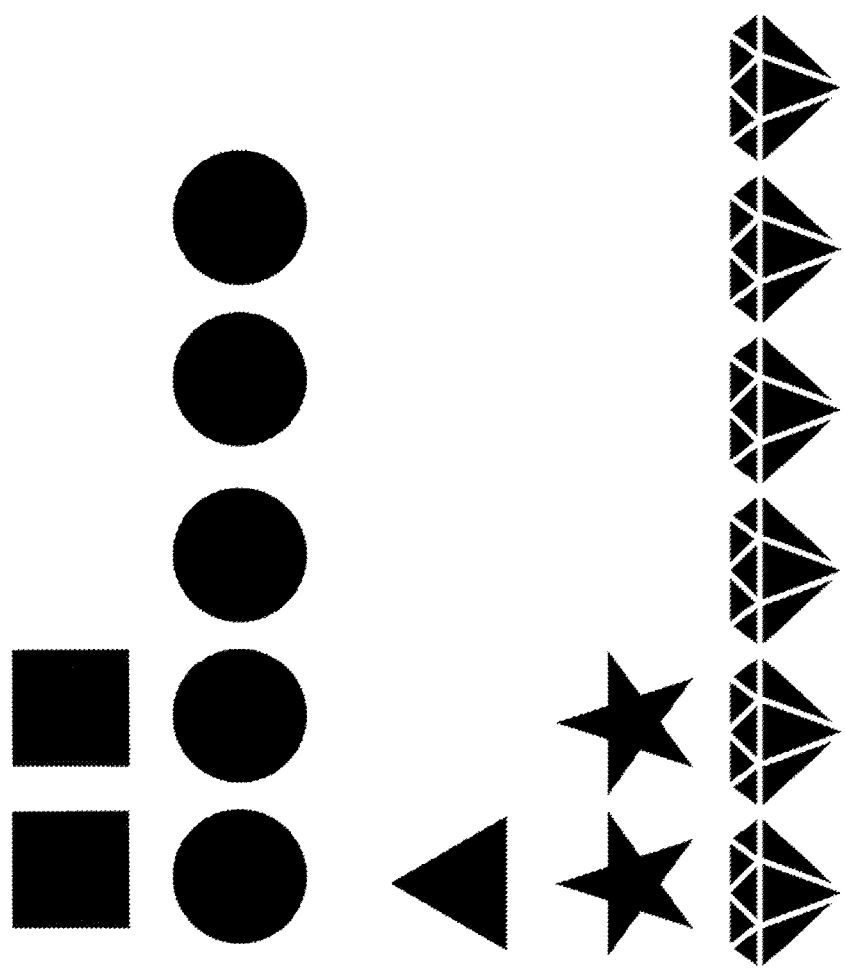
FIG. 4 is a first screen shot of a beginning option in one mode of execution of a wagering event according to the present invention.

FIG. 4 is a first screen shot of a beginning option in one mode of execution of a wagering event according to the present invention. In this format, all of the symbols that are to be made available to a player in the next screen are shown, plus a query as to whether the player wishes to continue with this specific set of symbols. The player may elect to continue (for the five credits), or wager a lesser amount. If the player does not wish to continue (e.g., by pressing a "SPIN" player input control), the player inputs a non-PLAY command, and will forfeit at least a part of the 5 credit wager allowed, such as always 20%, or always 40% of the initial wager.

Figure 5:
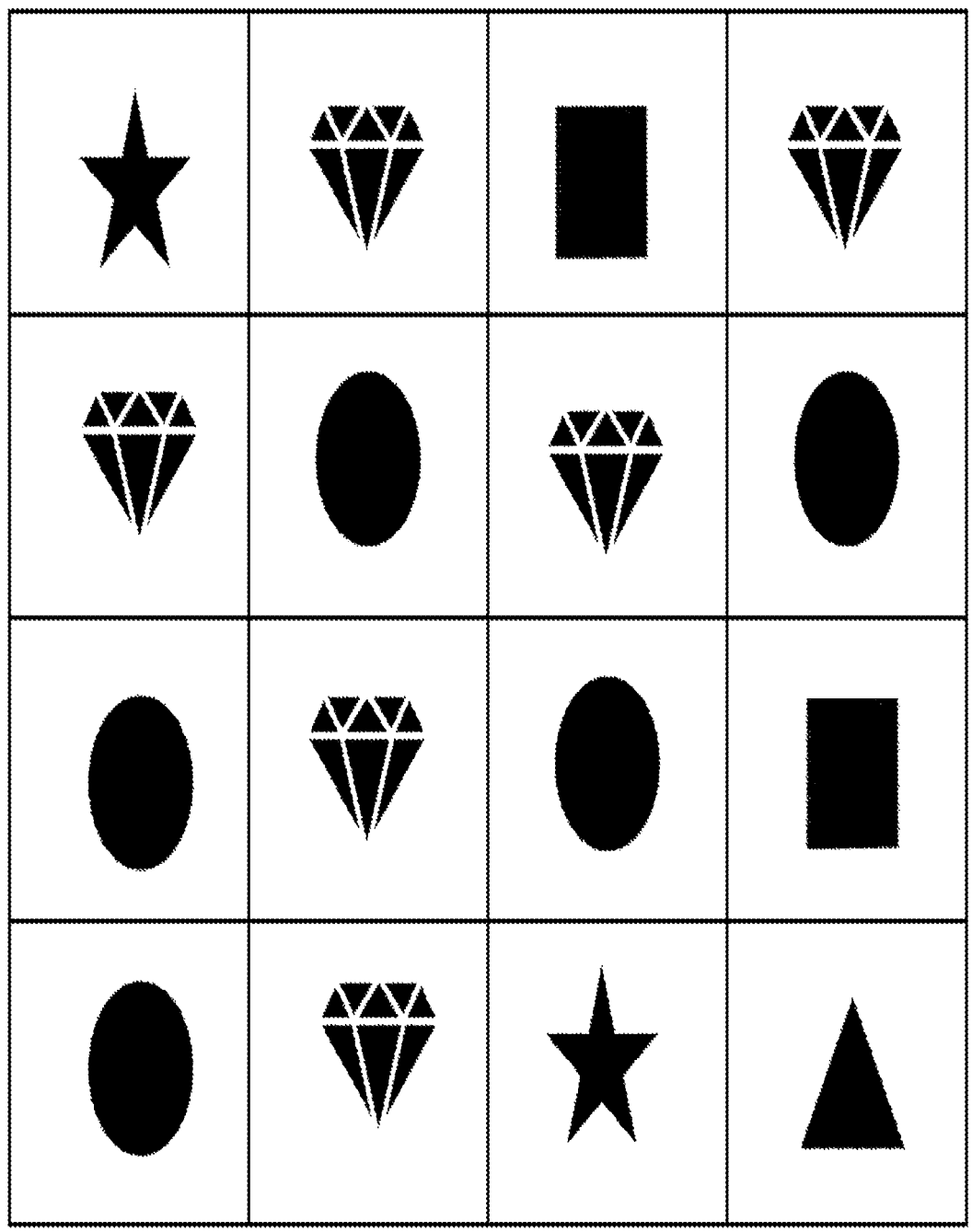
FIG. 5 is a second screen shot of a beginning option in one mode of execution of a wagering event according to the present invention.

FIG. 5 is a second screen shot of a beginning option in one mode of execution of a wagering event according to the present invention. All of the possible symbols indicated in FIG. 4 (there may be blank spaces also if fewer that 16 symbols for a 4×4 grid were originally displayed) are now shown in the 4×4 grid after the player input a signal to accept the play with the symbols of FIG. 4.

FIG. 6 is a third screen shot of a beginning option in one mode of execution of a wagering event according to the present invention. This screen shot shows two features discussed above. One is the random replacement of two standard symbols with "Wild" symbols, and the limiting control that only "2 moves" are allowed or that "2 moves" will create a maximum value distribution of symbols in the 4×4 grid.

FIG. 7 is a fourth screen shot of a beginning option in one mode of execution of a wagering event according to the present invention. This screen shot shows the limitation that there is "1 move left." This may mean that the player has exhausted all but one of the initial allotted moves, or that the original allotment of moves is one (1) only.

FIG. 8 is a fifth screen shot of an ending position in one mode of execution of a wagering event according to the present invention, starting with the screen of FIG. 6, then proceeding through the orientation of symbols in FIG. 7, and then ending with the final configuration of symbols here, after the allotted two original moves have been used.

FIG. 9 is a sixth screen shot of the identification of all paylines within the screen shot of FIG. 8.

These and other aspects of the present technology may be varied and modified and remain within the skill of the ordinary artisan and the following claims.

What is claimed:

1. A method of performing a gaming event on virtual symbols displayed on a display screen, wherein the gaming event:
    a) is effectuated by a plurality of programmatic instructions stored in a non-volatile memory, either remote or local to client devices and servers, and
    b) is executed by processors at the client devices or servers after input by a player into a player input device in communication with the non-volatile memory,
    said method comprising the steps of:
    c) providing a gaming application downloaded onto a mobile device and for use on a mobile platform;
    d) providing a database of virtual symbols and arrangements of symbols on a virtual grid format of multiple columns and multiple rows of frames;
    e) enabling an initiating user with the downloaded gaming application to place value at risk on an outcome of a gaming wager ultimately determined by predefined concluding outcomes of virtual symbol distribution on the virtual grid;
    f) receiving either: i) a first set of random virtual symbols filling all frames on the virtual grid and a random number of available controlled movements of adjacent pairs of virtual symbols, or ii) an unassigned random second set of symbols that are to be assigned into the virtual grid if the second set of virtual symbols is accepted for resolution of the gaming wager;
    g) upon occurrence of i), the player directing through the player input device a switch exchange of only adjacent virtual symbols by contacting each frame of adjacent virtual symbols, thereby signaling the processor at the client device or server to switch the virtual images in the adjacent frames within the virtual grid, and continuing to direct only switch exchanges until all available controlled movements are exhausted, forming a final grid array;
    h) upon occurrence of ii), the player, through the player input device, either iii) accepting the second set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the second set of virtual symbols and then the processors at the client devices or servers allowing controlled exchange movements of only adjacent pairs of virtual symbols by enabling the user to switch the virtual images in only the adjacent frames within the virtual grid, and continuing to direct only switch exchanges between adjacent pairs of virtual symbols until all available controlled movements are exhausted, forming a final grid array; or, through the player input device, iv) the player declining the second set of virtual symbols by inputting a declination signal to the client devices or servers and then receiving a third set of virtual symbols, the player accepting the third set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the third set of virtual symbols and then the processors at the client devices or servers allowing controlled exchange movements of only adjacent pairs of symbols by enabling the user to switch the virtual images in the adjacent frames within the virtual grid, and continuing to direct switch exchanges of only adjacent pairs of virtual symbols until all available controlled movements are exhausted, forming a final grid array; and
    i) after the final grid array has been formed, the client devices or servers resolves the gaming wager against a paytable based upon numbers and/or types of virtual symbols aligned in specific paylines on the grid in the final grid array at the conclusion of rearranging only the virtual symbols from the first set of virtual symbols or the second set of virtual symbols.

2. The method of claim 1 wherein the gaming event is performed online among members of an online social network and the gaming wager is further resolved by award or virtual non-economic online social network notifications or postable symbols.

3. The method of claim 1, wherein each player has a predetermined time period to identify adjacent virtual symbols that are to be switched, or a controlled movement is lost.

4. The method of claim 1 wherein the virtual symbols comprise at least four different symbols, each symbol having different shapes, sizes and/or colors so that the virtual symbols can be visually distinguished.

5. The method of claim 4 wherein the processor identifies a specific limit of numbers from the group consisting of 0, 1, 2, 3 and 4 of symbol exchanges that are allowed in a round of play.

6. The method of claim 1 wherein the player receives a first set of random virtual symbols filling all frames on the virtual grid and a random number of available controlled movements of only adjacent pairs of virtual symbols, the player exhausts all available controlled movements of only adjacent pairs of virtual symbols, and after the final grid array has been formed, the client devices or servers resolves the gaming wager against a paytable based upon numbers and/or types of virtual symbols aligned in specific paylines on the grid in the final grid array, with the gaming wager resolved at the conclusion of rearranging only the virtual symbols from the first set of virtual symbols.

7. The method of claim 6 wherein a first set of random virtual symbols filling all frames on the virtual grid consisting of four rows and four columns of frames forming the virtual grid and a random number of available controlled switch movements of only adjacent pairs of virtual symbols.

8. The method of claim 1 wherein after the player receives and accepts the unassigned random second set of virtual symbols in ii), the programmatic instructions are executed by the processors at the client devices or servers to randomly distribute the virtual symbols of the second set of virtual symbols into the virtual grid to form a virtual grid with all frames filled with individual ones of the virtual symbols of the second set of symbols and then the processors at the client devices or servers allowing controlled exchange movements of only adjacent pairs of symbols by enabling the user to switch the virtual images in only the adjacent frames within the virtual grid, and continuing to direct switch exchanges until all available controlled movements are exhausted, forming a final grid array; and, the client devices or servers resolves the gaming wager against a paytable based upon numbers and/or types of virtual symbols aligned in specific paylines on the grid in the final grid array, with the gaming wager resolved at the conclusion of rearranging only the virtual symbols from the second set of virtual symbols.

9. The method of claim 8 wherein the random number of available controlled switch movements consists of a random number selected from the group consisting of 0, 1, 2, 3 and 4.

10. The method of claim 9 wherein a dedicated button is on the player input device to decline any unused random number of available controlled switch movements.

11. The method of claim 1 wherein after the player receives and declines the unassigned random second set of symbols in ii), the programmatic instructions are executed by the processors at the client devices or servers first provide a third random set of virtual random symbols that are then accepted and then to randomly distribute the virtual symbols of the third random set of virtual symbols into the virtual grid to form a virtual grid with all frames filled with individual ones of the virtual symbols of the third random set of symbols and then the processors at the client devices or servers allowing controlled exchange movements of adjacent pairs of symbols by enabling the user to switch the virtual images in only adjacent frames within the virtual grid, and continuing to direct switch exchanges until all available controlled movements are exhausted, forming a final grid array; and, the client devices or servers resolves the gaming wager against a paytable based upon numbers and/or types of virtual symbols aligned in specific paylines on the grid in the final grid array.

12. The method of claim 1 wherein the random number of available controlled switch movement consists of a random number selected from the group consisting of 0, 1, 2, 3 and 4.

13. The method of claim 12 wherein a dedicated button is on the player input device to decline any unused random number of available controlled switch movements.

14. The method of claim 1 wherein a first set of random virtual symbols consisting of a total of 16 random symbols fills all 16 frames on the virtual grid having four columns and four rows of frames and a random number of available controlled movements of adjacent pairs of virtual symbols is provided by the processor.

15. The method of claim 1, wherein each player has a predetermined time period to identify adjacent virtual symbols that are to be switched, or a controlled movement is lost and the value placed at risk is resolved at the conclusion of only rearranging the virtual symbols from the first set of virtual symbols.

16. A method of operating an Application (APP) on a hand-held telecommunication device with a processor, player input controls and video display therein, the method comprising: connecting an APP operating device in the hand-held communication device through a wireless connection to an APP output device; transmitting programmatic gaming instructions of a gaming event APP from the APP operating device to the hand-held communication device to be stored in non-volatile memory, the hand-held communication device downloading the gaming APP for access by the processor, wherein the gaming event:

a) is effectuated by a plurality of programmatic instructions stored in the non-volatile memory in communication with the processor, and b) is executed by the processor in the hand-held device by player input through the player input device in communication with the non-volatile memory, said method comprising the steps of:

c) the processor executing the downloaded gaming event APP downloaded;

d) the processor providing a database of virtual symbols and arrangements of virtual symbols on a virtual grid format of multiple columns and multiple rows of frames from the non-volatile memory;

e) enabling an initiating user with the downloaded gaming application to initiate a game event based ultimately determined by predefined outcomes of virtual symbol distribution on the virtual grid;

f) the visual display receiving and displaying either: i) a first set of random virtual symbols filling all frames on the virtual grid and a random number of available controlled movements of adjacent pairs of virtual symbols, or ii) an unassigned random second set of symbols that are to be assigned into the virtual grid if the second set of virtual symbols is accepted for resolution of the gaming wager;

g) upon occurrence of i), the player directing through the player input controls a switch exchange of adjacent virtual symbols by contacting each frame of adjacent virtual symbols, thereby signaling the processor to switch the virtual images in the adjacent frames within the virtual grid, and continuing to direct switch exchanges until all available controlled movements are exhausted, forming a final grid array;

h) upon occurrence of ii), the player, through the player input controls, either iii) accepting the second set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the second set of symbols and then the processor allowing controlled movements of adjacent pairs of symbols by enabling the player input controls to switch the virtual images in the adjacent frames within the virtual grid, and continuing to direct switch exchanges until all available controlled movements are exhausted, forming a final grid array; or, through the player input device, iv) the player input controls declining the second set of symbols by inputting a declination signal to the processor and then receiving a third set of virtual symbols, the player input controls accepting the third set of virtual symbols, and then the programmatic instructions are executed by the processors randomly distributing the virtual symbols of the second set of virtual symbols into the virtual grid to form a virtual grid with all frames filled with individual ones of the virtual symbols of the third set of symbols and then the processors allowing controlled movements of adjacent pairs of symbols by enabling the player input controls to switch the virtual images in the adjacent frames within the virtual grid, and continuing to direct switch exchanges until all available controlled movements are exhausted, forming a final grid array; and i) after the final grid array has been formed, the processor resolving the gaming wager against a paytable based upon numbers and/or types of virtual symbols aligned in specific paylines on the grid in the final grid array at the conclusion of rearranging only the virtual symbols from the first set of virtual symbols or the second set of virtual symbols after the processor has provided the player with a random number of available controlled switch movements of only adjacent pairs of virtual symbols.

17. A method of executing a gaming event on a video gaming system comprising a housing, a processor, a video display, player input controls and a value-in-value-out system selected from the group consisting of ticket-in-ticket-out systems with a scanner and printer and currency accepting and validation readers with a scanner or reader for entering wagerable value and withdrawing accrued value from the video gaming system, the processor having game content information stored in non-volatile memory, wherein the gaming event:

a) is effectuated by a plurality of programmatic instructions stored in the non-volatile memory in communication with the processor, and b) is executed by the processor by player input through the player input device in communication with the non-volatile memory, said method comprising the steps of:

c) the processor providing a database of virtual symbols and arrangements of virtual symbols on a virtual grid format of multiple columns and multiple rows of frames from the non-volatile memory and the processor providing the player with a random number of available controlled switch movements of only adjacent pairs of virtual symbols;

d) enabling an initiating player position with the downloaded gaming application to initiate a game event after placing a wager of value stored in the video gaming system, the game event ultimately determined by predefined outcomes of virtual symbol distribution on the virtual grid;

e) the visual display receiving and displaying either: i) a first set of random virtual symbols filling all frames on the virtual grid and a random number of available controlled switch movements of only adjacent pairs of virtual symbols, or ii) an unassigned random second set of virtual symbols that are to be assigned into the virtual grid if the second set of virtual symbols is accepted for resolution of the gaming wager;

f) upon occurrence of i), the player directing through the player input controls a switch exchange of only adjacent virtual symbols by contacting each frame of only the adjacent virtual symbols, thereby signaling the processor to switch the virtual images in only the adjacent frames within the virtual grid, and continuing to direct only switch exchanges until all available controlled movements are exhausted, forming a final grid array;

g) upon occurrence of ii), the player, through the player input controls, either iii) accepting the second set of virtual symbols, and then the programmatic instructions are executed by the processors at the client devices or servers to randomly distributed the virtual symbols of the second set of virtual symbols into the virtual grid to form a virtual grid with all frames filled with individual ones of the virtual symbols of the second set of symbols and then the processor allowing controlled movements of adjacent pairs of symbols by enabling the player input controls to switch the virtual images in the adjacent frames within the virtual grid, and continuing to direct switch exchanges until all available controlled movements are exhausted, forming a final grid array; or, through the player input device, iv) the player input controls declining the second set of symbols by inputting a declination signal to the processor and then receiving a third set of virtual symbols, the player input controls accepting the third set of virtual symbols, and then the programmatic instructions are executed by the processors randomly distributing the virtual symbols of the second set of virtual symbols into the virtual grid to form a virtual grid with all frames filled with individual ones of the virtual symbols of the third set of symbols and then the processors allowing controlled movements of adjacent pairs of symbols by enabling the player input controls to switch the virtual images in the adjacent frames within the virtual grid, and continuing to direct switch exchanges until all available controlled movements are exhausted, forming a final grid array; and h) after the final grid array has been formed, the processor resolving the wager of value in the gaming event against a paytable based upon numbers and/or types of virtual symbols aligned in specific paylines on the grid in the final grid array at the conclusion of only rearranging the virtual symbols from the first set of virtual symbols or the second set of virtual symbols.

18. The method of claim 17 wherein the gaming event requires that value is placed at risk on an outcome of a gaming wager, and resolution of the gaming event is based on resolution of the wager against the paytable for value accounted for in the processor at the conclusion of only rearranging the virtual symbols from the first set of virtual symbols.

19. The method of claim 18 wherein the virtual symbols comprise at least four different symbols, each symbol having different shapes, sizes and/or colors so that the virtual symbols can be visually distinguished, and wherein a first set of random virtual symbols filling all frames on the virtual grid consisting of four rows and four columns of frames forming the virtual grid and the processor randomly provides a random number of available controlled switch movements of only adjacent pairs of virtual symbols, said random number of available controlled switch movements consisting of a single random number selected from 0, 1, 2, 3 and 4.

20. The method of claim 19 wherein the player receives a first set of random virtual symbols filling all frames on the virtual grid and a random number of available controlled movements of adjacent pairs of virtual symbols, the player exhausts all available controlled movements of adjacent pairs of virtual symbols, and after the final grid array has been formed, the client devices or servers resolves the gaming wager against a paytable based upon numbers and/or types of virtual symbols aligned in specific paylines on the grid in the final grid array, and wherein a first set of random virtual symbols filling all frames on the virtual grid consisting of four rows and four columns of frames forming the virtual grid and the processor randomly provides a random number of available controlled switch movements of only adjacent pairs of virtual symbols, said random number of available controlled switch movements consisting of a single random number selected from 0, 1, 2, 3 and 4.

* * * * *